US011233709B2

(12) United States Patent
Jorgenson et al.

(10) Patent No.: US 11,233,709 B2
(45) Date of Patent: *Jan. 25, 2022

(54) METHOD AND SYSTEM FOR MONITORING PERFORMANCE OF AN APPLICATION SYSTEM

(71) Applicant: INETCO SYSTEMS LIMITED, Burnaby (CA)

(72) Inventors: Loki Jorgenson, Vancouver (CA); Alfred Yu-Han Pang, Vancouver (CA)

(73) Assignee: INETCO SYSTEMS LIMITED, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,387

(22) Filed: Jan. 21, 2020

(65) Prior Publication Data
US 2020/0162352 A1 May 21, 2020

Related U.S. Application Data

(63) Continuation-in-part of application No. 14/248,094, filed on Apr. 8, 2014, now abandoned, which is a (Continued)

(51) Int. Cl.
*G06F 15/173* (2006.01)
*H04L 12/26* (2006.01)
(Continued)

(52) U.S. Cl.
CPC .......... *H04L 43/04* (2013.01); *G06F 11/3495* (2013.01); *H04L 41/12* (2013.01);
(Continued)

(58) Field of Classification Search
CPC ............. G06F 11/3409; G06F 11/3495; G06F 2201/865; G06F 2201/87; G06F 2201/875;
(Continued)

(56) References Cited

U.S. PATENT DOCUMENTS

| 6,108,700 A | 8/2000 | Maccabee et al. |
| 6,701,459 B2 | 3/2004 | Ramanathan et al. |

(Continued)

FOREIGN PATENT DOCUMENTS

WO  2009/096970 A1  8/2009

OTHER PUBLICATIONS

European Patent Office, Extended European Search Report dated Mar. 11, 2015 for Corresponding European Patent Application No. 12814717.0.
(Continued)

*Primary Examiner* — Ryan J Jakovac
(74) *Attorney, Agent, or Firm* — Conneely PC; Joseph Conneely

(57) ABSTRACT

A method for monitoring performance of an application system which is distributed across a plurality of network connected nodes, comprising: generating a hierarchical model for the application system, the hierarchical model having a plurality of levels, each level including components of a span specific to that level; mapping the application system onto the hierarchical model according to a network topology of the application system; monitoring network traffic between the plurality of network connected nodes of the application system to gather network traffic data; assembling the network traffic data into application messages; correlating the application messages into sets of one or more application messages that are causally associated in accordance with the hierarchical model, wherein the sets of causally associated application messages constitute transactions corresponding to a lowest level of the hierarchical model; and, generating records of individual transactions occurring within the application system for at least the transactions corresponding to the lowest level of the hierarchical model.

43 Claims, 15 Drawing Sheets

Related U.S. Application Data continuation of application No. 13/184,274, filed on Jul. 15, 2011, now Pat. No. 8,732,302.

(51) Int. Cl.
*G06F 11/34* (2006.01)
*H04L 12/24* (2006.01)

(52) U.S. Cl.
CPC .... *G06F 11/3409* (2013.01); *G06F 2201/865* (2013.01); *G06F 2201/87* (2013.01); *G06F 2201/875* (2013.01)

(58) Field of Classification Search
CPC ... G06Q 10/067; H04L 41/0893; H04L 41/12; H04L 41/5003; H04L 41/5009; H04L 43/00; H04L 43/04; H04L 43/06; H04L 43/062; H04L 67/02; H04L 67/10; H04L 69/329
See application file for complete search history.

(56) References Cited

U.S. PATENT DOCUMENTS

| | | | |
|---|---|---|---|
| 7,003,433 B2 | 2/2006 | Yemini et al. | |
| 7,337,184 B1 | 2/2008 | Or et al. | |
| 7,568,019 B1* | 7/2009 | Bhargava | G06Q 10/06 |
| | | | 709/223 |
| 7,805,510 B2 | 9/2010 | Bansal et al. | |
| 7,822,837 B1 | 10/2010 | Urban et al. | |
| 7,930,158 B2 | 4/2011 | Yemini et al. | |
| 7,949,739 B2 | 5/2011 | Florissi et al. | |
| 8,732,302 B2 | 5/2014 | Jorgenson et al. | |
| 2003/0014464 A1 | 1/2003 | Deverill et al. | |
| 2003/0046390 A1 | 3/2003 | Ball et al. | |
| 2004/0039728 A1 | 2/2004 | Fenlon et al. | |
| 2005/0021736 A1 | 1/2005 | Carusi et al. | |
| 2006/0015512 A1 | 1/2006 | Alon et al. | |
| 2006/0179348 A1 | 8/2006 | Florissi et al. | |
| 2006/0242288 A1 | 10/2006 | Masurkar | |
| 2008/0306712 A1 | 12/2008 | Chen | |
| 2009/0158246 A1* | 6/2009 | Sifter | G06F 9/466 |
| | | | 717/105 |
| 2010/0070447 A1 | 3/2010 | Pfuntner et al. | |
| 2011/0022707 A1 | 1/2011 | Bansal et al. | |
| 2011/0035493 A1 | 2/2011 | Shacham et al. | |
| 2014/0223007 A1 | 8/2014 | Jorgenson et al. | |

OTHER PUBLICATIONS

Canadian Intellectual Property Office (ISA/CA), International Search Report and Written Opinion dated Oct. 17, 2012 for Corresponding International Patent Application No. PCT/CA2012/000646.

Schmid, M. et al., "A Generic Application-Oriented Performance Instrumentation for Multi-Tier Environments", Proceedings of the 10th IFIP/IEEE International Symposium on Integrated Network Management IM '07, May 21-25, 2007, Munich, Germany, pp. 304-313, May 21, 2007.

Van Der Zee, A. et al., "mBrace: Action-Based Performance Monitoring of Multi-Tier Web Applications", Proceedings of 2009 International Conference on Computational Science and Engineering CSE '09, Aug. 29-31, 2009, Vancouver, BC, Canada, pp. 166-173, Aug. 29, 2009.

Agarwala, S. et al., "SysProf: Online Distributed Behavior Diagnosis Through Fine-Grain System Monitoring", Proceedings of the 26th IEEE International Conference on Distributed Computing Systems ICDCS '06, Jul. 4-7, 2006, Lisboa, Portugal, 8 pages, Jul. 4, 2006.

European Patent Office, Examination Report dated May 29, 2017 for Corresponding European Patent Application No. 12814717.0.

\* cited by examiner

| Data Type | Metrics | Data Sources |
|---|---|---|
| Business | - Business goals SLA compliance (failures, average application durations)<br>- Financial impact of incomplete/failed business goals<br>- % successful vs failed business goals<br>- # of business goals completed<br>- # of business goals not completed<br>- Durations (user vs application time) | - Business goals i.e. 'Create new account' |
| Application | - Application SLA compliance (up time, failures, average durations)<br>- % successful vs failed application transactions by application and type<br>- Errors<br>- Cause of errors (latency vs status, link or node that failed)<br>- Durations<br>- # of transactions | - Applications i.e 'Teller'<br>- Appliation types i.e. 'add money' |
| Services | - Service SLA compliance (failures, average durations)<br>- Impact of failed service transactions (what applications, businesses were effected and for how long)<br>- % of successful vs failed service transactions<br>- Errors<br>- Durations | - Services i.e. 'HTTP'<br>- Service types i.e. 'HTTP.teller' |
| Link Network Compnents | - % success vs failures<br>- durations, latency<br>- concurrency<br>- network vs application delay | - Links & Nodes<br>- Link groups |

FIG. 15

METHOD AND SYSTEM FOR MONITORING PERFORMANCE OF AN APPLICATION SYSTEM

This application is a continuation-in-part of U.S. patent application Ser. No. 14/248,094, filed Apr. 8, 2014, which is a continuation of U.S. patent application Ser. No. 13/184,274, filed Jul. 15, 2011, and the entire content of such applications is incorporated herein by reference.

FIELD OF THE INVENTION

This invention relates to the field of network message monitoring, and more specifically, to a method and system for monitoring performance of an application system which is distributed across network connected nodes.

BACKGROUND OF THE INVENTION

Businesses often need to monitor the real-time behaviour and performance of applications that are distributed across multiple network-connected nodes, physical or virtual, with respect to meaningful data messages passed between the nodes. Application data messages between the nodes may be monitored at various possible locations including within the application, within the nodes, or at some intermediate network device. In some cases, it is only possible to monitor such messages by monitoring the network itself. This can be the case when there is no way to access application data directly on the host computer or application server. To obtain a higher level understanding of the application performance, the data messages being passed between nodes require correlation into transactions.

While several methods and system have been proposed for application data message monitoring, these methods and systems have disadvantages. For example, U.S. Pat. No. 7,805,510 to Bansal et al. discloses a hierarchy for characterizing interactions with an application and teaches a network monitoring system and an application monitoring system working in conjunction. The two sources of data are combined to formulate transactions within a hierarchy that ranges from components up to business processes within a domain. Bansel et al. also discloses implementations of either network or application monitoring within the same hierarchy. Types of transactions are defined at each level of the hierarchy. The composition of higher level transactions relies on associating a plurality of lower level transactions (or "components" at the lowest level) all from the same network link. However, Bansal et al. does not disclose a method for following transactions across multiple links of a complex network topology.

As another example, U.S. Pat. No. 6,701,459 to Ramanathan et al. discloses a root-cause approach to problem diagnosis in data networks and teaches generating a network topology representation, subsequently generating a logical network topology, mapping the components of the topology into layers of hierarchy based on the protocol stack, and mapping specific measurements to the layers. As such, Ramanathan et al. uses a network topology, both physical and logical, to interpret data derived from the system. It recognizes a specific hierarchy that enables the data to be interpreted effectively and translates the interpreted data into performance measures that are specific to the level within the hierarchy that the data applies to. However, the hierarchy of Ramanathan et al. is specific to the protocol stack in use within the system. The levels correspond approximately to each layer within the OSI Layer model such that events or data are specific to a given protocol within the stack. As such, Ramanathan does not address higher level transactions across multiple links in a network.

As a further example, United States Patent Application Publication No. 2011/0035493 by Shacham et al. discloses an apparatus and method for tracking requests in a multi-threaded, multi-tier computerized environment and teaches detecting messages being passed between components of a multi-tier system, correlating the messages between neighbouring tiers, and thereby associating them together across the tiers. However, while Shacham et al. provides for a simplified form of correlation across adjacent links, it does not teach how these are subsequently correlated across multiple tiers of a complex network topology to form higher-level transactions or how correlation can be optimized for real-time processing.

A need therefore exists for an improved method and system for monitoring performance of an application system which is distributed across network connected nodes. Accordingly, a solution that addresses, at least in part, the above and other shortcomings is desired.

SUMMARY OF THE INVENTION

According to one aspect of the invention, there is provided a method for monitoring performance of an application system which is distributed across a plurality of network connected nodes, comprising: generating a hierarchical model for the application system, the hierarchical model having a plurality of levels, each level including components of a span specific to that level; mapping the application system onto the hierarchical model according to a network topology of the application system; monitoring network traffic between the plurality of network connected nodes of the application system to gather network traffic data; assembling the network traffic data into application messages; correlating the application messages into sets of one or more application messages that are causally associated in accordance with the hierarchical model, wherein the sets of causally associated application messages constitute transactions corresponding to a lowest level of the hierarchical model; and, generating records of individual transactions occurring within the application system for at least the transactions corresponding to the lowest level of the hierarchical model.

According to another aspect of the invention, there is provided a method for monitoring performance of an application system which is distributed across a plurality of network connected nodes, comprising: using a processor, monitoring network traffic between the plurality of network connected nodes of the application system to gather network traffic data; assembling the network traffic data into application messages; correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; and, generating records for one or more of the transactions.

According to another aspect of the invention, there is provided a method for monitoring performance of an application system which is distributed across a plurality of network connected nodes, comprising: using a processor, monitoring network traffic between the plurality of network connected nodes of the application system to gather network traffic data; assembling the network traffic data into application messages; correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; identifying attributes of one or more of the transactions; and, applying one or more metrics to the attributes to measure performance of the application system.

In accordance with further aspects of the present invention there is provided an apparatus such as a data processing system, a method for adapting these, as well as articles of manufacture such as a computer readable medium or product and computer program product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which:

FIG. 15 is a table illustrating an example of metrics specific to transaction type in accordance with an embodiment of the invention;

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, wireless devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

According to one embodiment of the invention, there is provided a method and system (or apparatus) for enabling and optimizing the real-time correlation of individual transactions on multiple network links of a distributed multi-link message-based system to generate aggregate transactions, including end-to-end transactions. The aggregate transactions comprise individual transactions that are causally related and span one or more links of the system. A hierarchical model (e.g., 400 in FIG. 18) applied to the network topology (e.g., 810 in FIG. 8) determines the span of links across which individual transactions are associated and provides the basis for their association. The hierarchy of levels extends across the network topology, each level corresponding to a degree of span, from the individual network links up to the entire system, with a definition of transaction specific to each level. Transactions on each level are defined as comprising one or more transactions from a next lower level, across one or more spans of that level of the network topology. At the lowest level, transactions comprise application protocol messages exchanged across a single network link to achieve a specific task, the messages having been composed from data units of the underlying transport protocol, those data units having been composed from data units of the underlying network protocol. The hierarchical model further provides a means of enabling and optimizing the correlation of lower-level transactions into next-higher-level transactions by segmenting correlation across spans of increasing size. Further, each level of the model is identified with a population of actors who define how the subsequent levels of transactions are analyzed and interpreted. In particular, there are one or more performance metrics specific to each level that are used to interpret the performance and behaviour of the transactions at each level.

Figure 18:
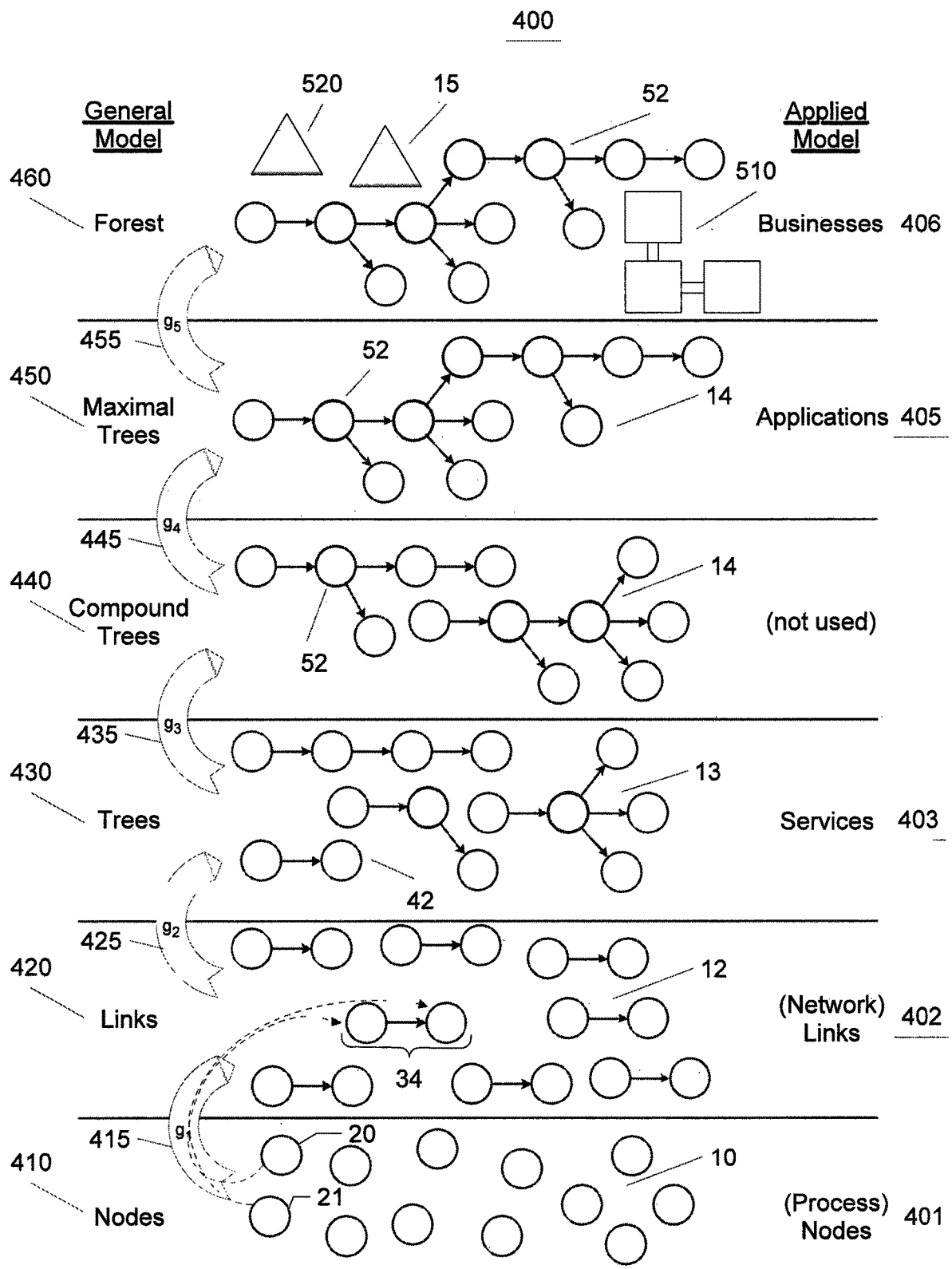

FIG. 18 is a block diagram illustrating a Unified Transaction Model ("UTM") in accordance with an embodiment of the invention. As will be discussed in more detail below, FIG. 18 shows a hierarchical model 400 of levels, each containing components of specific span, generated via a generative function $g_i$ from components contained at a next-lower level, and the correspondence of the general model to a specific instance defining nodes, links, services, applications and businesses. The invention provides a hierarchical model (i.e., the UTM) for correlating network messages into transactions. The UTM is an ontological model and the invention provides a method for applying it to generate transactions and an implementation of it. The UTM includes four components as follows: (1) A hierarchical model 400 including definitions of system components, their properties, actors, inter-dependencies, relationships, and events (messages and transactions); (2) A network topology-based approach to the mapping of a message-based system into the UTM definitions that associates events such as transactions across multiple tiers and network links; (3) A real-time correlation process that constructs instances of events (transactions) at each level of the hierarchy, selecting the events from the lower level to aggregate in terms of the topological model; and, (4) An analysis of the events on each level with metrics of performance that are specific to each level, selected in accordance with the model's definition of the levels, with respect to the requirements of each level, and the actors who interact with each level.

The UTM describes the structures, relationships, and message events that are particular to message-based transactional systems. The UTM is beneficial for information technology ("IT") systems (e.g., 800 in FIG. 8) that are distributed, multi-tier, and composed of multiple network links, and thus complex. In implementation, it decomposes the IT system 800 into a nested set of regions or "spans" according to the network topology 810 and functional implementation of its components. Subsequently, it supports the translation of events at each level of the system into types of transactions, each with a relationship to the types at other levels. Each level of the system and its corresponding transaction type maps into a view relevant to certain actors within the system.

The UTM coupled with the network topology provides a framework for the correlation of transactions. The framework defines the relationships between lower level events and higher level events, and also optimizes the construction of higher level events for performance in real-time implementations. The UTM may be implemented in a business transaction monitoring tool or system (e.g., 300 in FIG. 16) that processes network traffic into transactions across multiple links in real-time. It is configured with the details of a specific network topology 810 that defines the various components and relationships within the model hierarchy 400. It analyzes and assembles the network traffic from one or more points in a network topology into host-to-host transactions. Subsequently, it groups host-to-host transactions into more complex aggregates on the basis of the topology. Finally, it assembles the highest level of transaction as an end-to-end event.

At each transaction level, the behaviour of the constructed transactions may subsequently be analyzed for performance and used to diagnose issues within the business transaction system 800. One or more metrics of performance may be applied at each level. The nature of the metrics depend on a variety of factors including the following: (1) What individuals, groups, or roles have an interest in a given level of the business system 800 (2) What metrics are typically applied or have been standardized for that level of the business system 800 (3) How does a given metric relate to metrics at levels above and/or below the level it is applied at? (4) What information is available at a given level relating to transactions, the underlying components, end-user experience, etc.? For example, it may be appropriate to define and apply a metric specific to end-user experience (e.g., application performance index ("Apdex"), user decline rate, etc.) at the application level. By contrast, a network-oriented measure may be better suited at the network level (e.g., message loss rate, latency variation, etc.).

Figure 16:
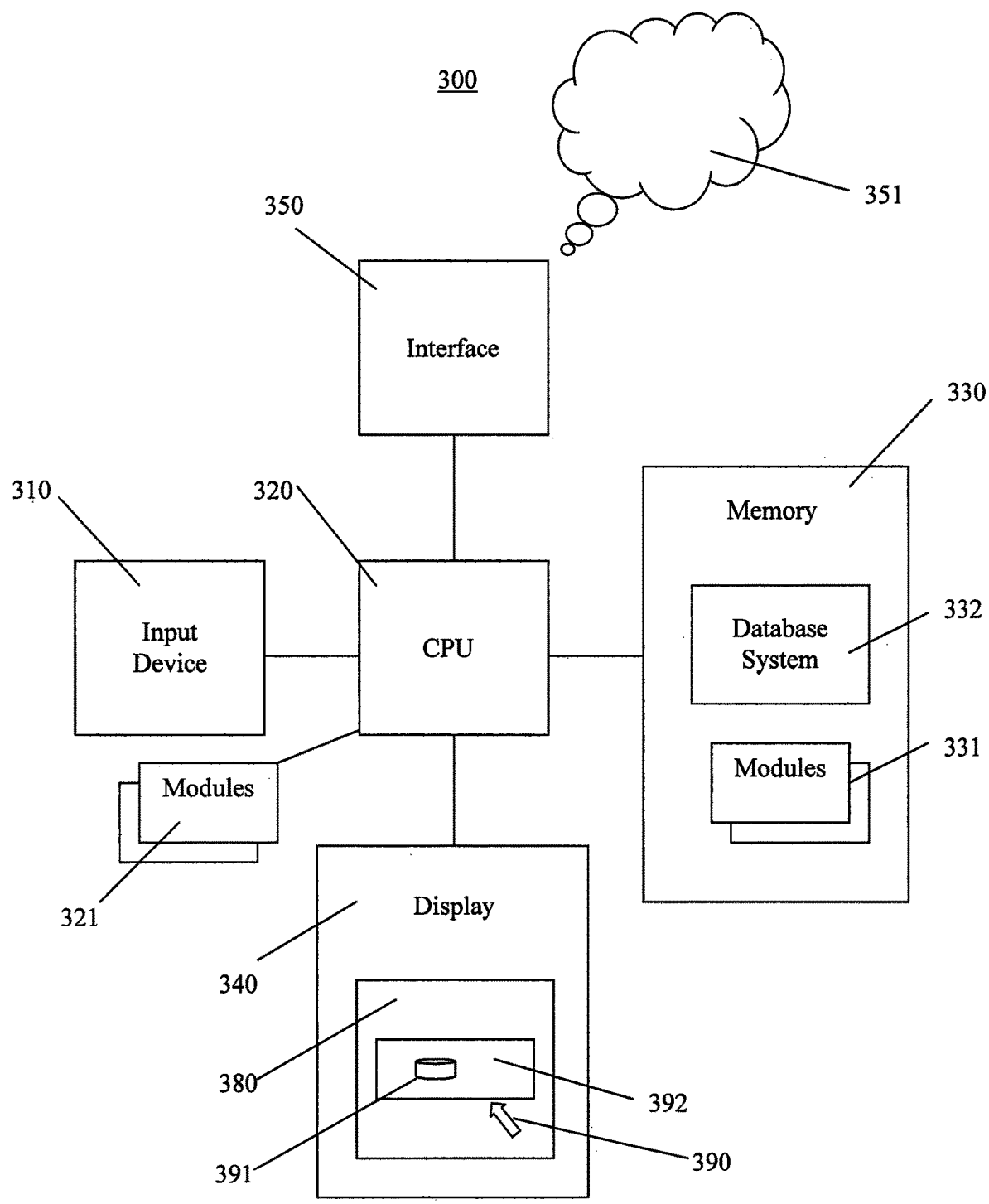
FIG. 16 is a block diagram illustrating a data processing system in accordance with an embodiment of the invention.

FIG. 16 is a block diagram illustrating a data processing system 300 in accordance with an embodiment of the invention. The data processing system 300 is suitable for network message monitoring and for generating, displaying, and adjusting presentations in conjunction with a graphical user interface ("GUI"), as described below. The data processing system 300 may be a client and/or server in a client/server system (e.g., 800). For example, the data processing system 300 may be a server system or a personal computer ("PC") system. The data processing system 300 may also be a mobile device or other wireless, portable, or handheld device. The data processing system 300 may also be a distributed system which is deployed across multiple processors. The data processing system 300 may also be a virtual machine. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium (or product) (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium (or product) that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Referring again to FIG. 18, the UTM introduced above originates with an ontological model 400 composed of a hierarchical set of definitions of system components, their properties, actors, inter-dependencies, functional and topological relationships, and event entities. The model hierarchy is isomorphic across each level 410, 420, 430, 440, 450, 460 with one or more generative operators $g_1$ 415, $g_2$ 425, $g_3$ 435, $g_4$ 445, $g_5$ 455 between levels that transform events in a lower level (e.g., 410) into events at a next level higher (e.g., 420). The number of levels is variable and the exact number depends on the details of the system 800 against which the model 400 is applied. The lowest level 410 also defines certain primitives that anchor the framework and bootstrap the generation of events at the subsequent level. Each level is associated with a degree of "span" which defines the scope of objects within that level.

Figure 1:
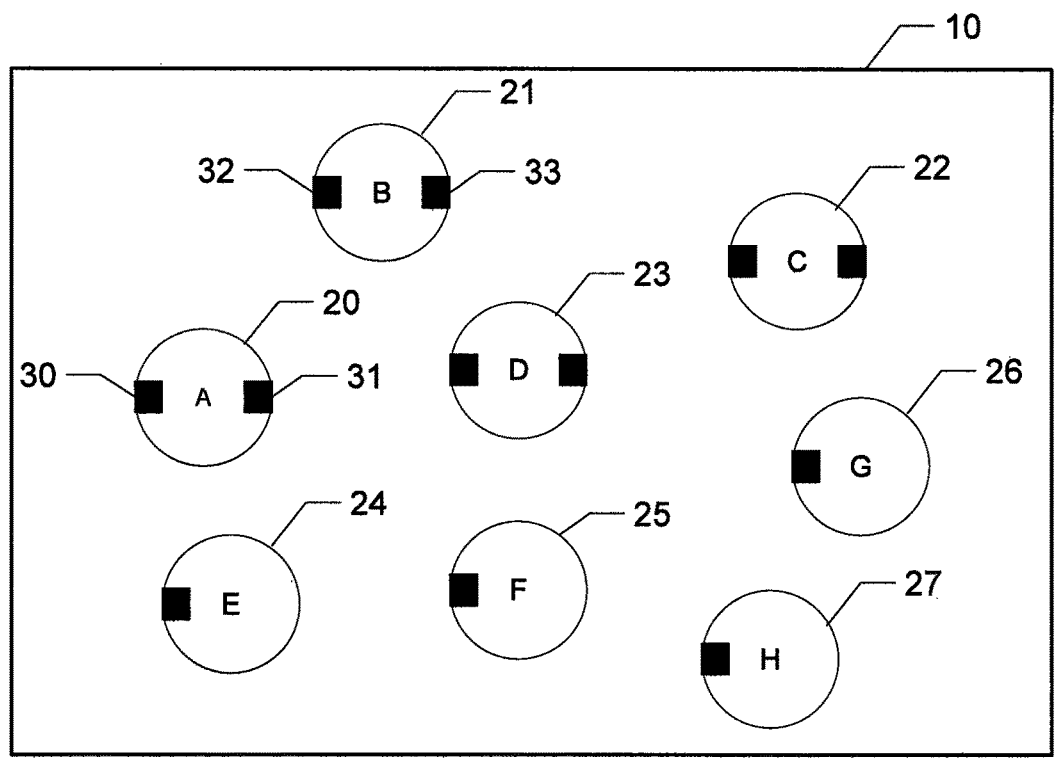
FIG. 1 is a block diagram illustrating a set of nodes with connection points in accordance with an embodiment of the invention.

FIG. 1 is a block diagram illustrating a set 10 of nodes 21-27 with connection points 31-33 in accordance with an embodiment of the invention. The model defines a primitive referred to as a "node". A node represents a type of component or structural entity. The lowest level 410 of the model 400 comprises the set of all selected nodes. FIG. 1 shows a set 10 of selected nodes 21-27. The span of this level is trivial insofar as the nodes are not connected. Each node 21-27 has a unique identifier (e.g., A, B, C, etc. or 21, 22, 23, etc.), one or more unique connection points (e.g., connection points 30, 31 on node 20), and other descriptive or functional attributes (e.g., a node definition may include a port number for the connection and a communication protocol). A generative operator $g_1$ 415 between this level 410 and the next 420 associates any two nodes through connection anchored at a connection point on each. In graph theory, the connection between nodes is referred to as an "edge".

Figure 2:
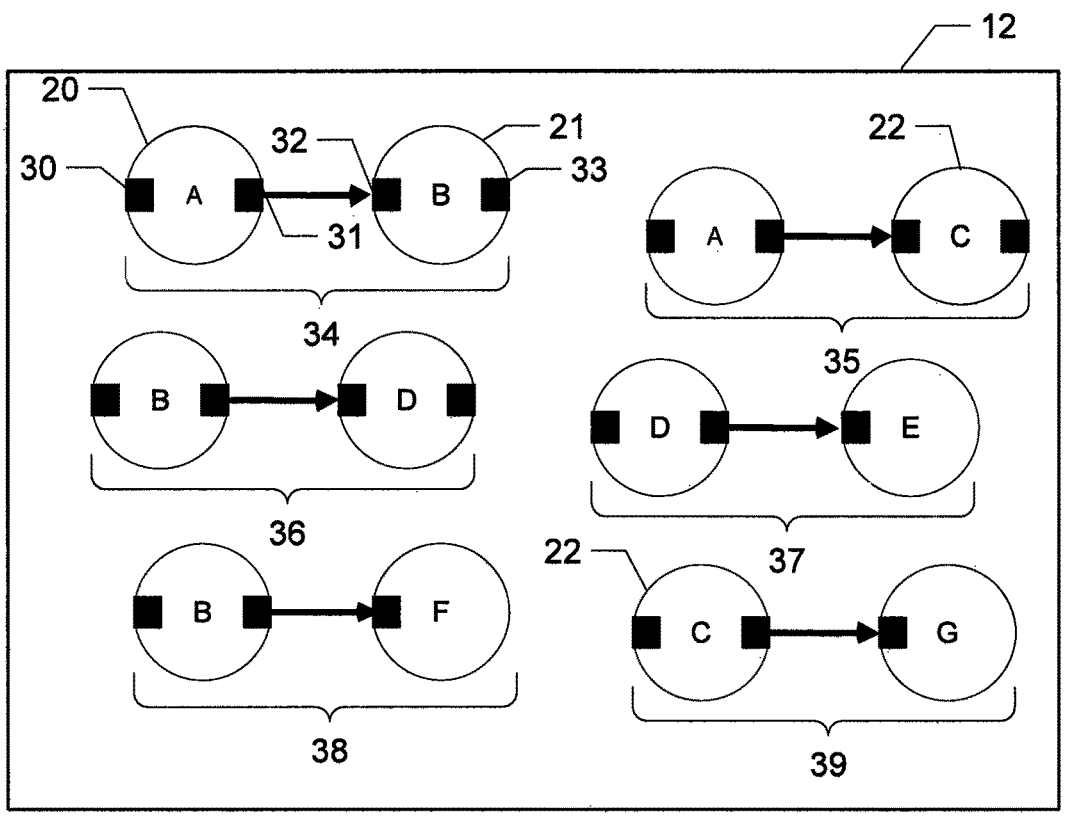
FIG. 2 is a block diagram illustrating a set of links comprising nodes in accordance with an embodiment of the invention.

FIG. 2 is a block diagram illustrating a set 12 of links 34-39 comprising nodes 21-27 in accordance with an embodiment of the invention. At this subsequent level 420, a "link" is defined as two nodes connected via an edge. FIG. 2 shows a set 12 of links 34-39. A link is further defined by the choice of connection points, in cases where a given node has more than one. The span of this level 420 is constrained to objects including a single edge. The edge is directional such that a link is a minimal directed acyclic graph ("DAG"). A pair of nodes, e.g., node 20 and node 21, may define at least two distinct links for a given choice of connection points, one for each direction. FIG. 2 shows the link 34 for one direction and set of connection points 31, 32 for nodes 21, 22. Additional unique links may be possible if there are other node attributes that are required to define a link. Not all possible links are generated. Selection rules depend upon factors arising from the system 800 against which this model 400 is applied.

This level 420 of the model 400 comprises all generated links and does not include any unconnected nodes. Note that node 27 does not appear in any member of the set 12 of links 34-39. Each link has a unique identifier (e.g., 34, 35, 36, etc.) and uniquely comprises its constituent nodes, the direction of the edge, the connection point on each node and any other elemental attributes. The generative operator $g_2$ 425 between this level 420 and the next level 430 produces one or more sets comprising one or more links such that each link in a set has exactly one node in common with at least one other link of the set. The links are subsequently connected together at the common nodes to form a new type of object specific to the next level 430.

Figure 3:
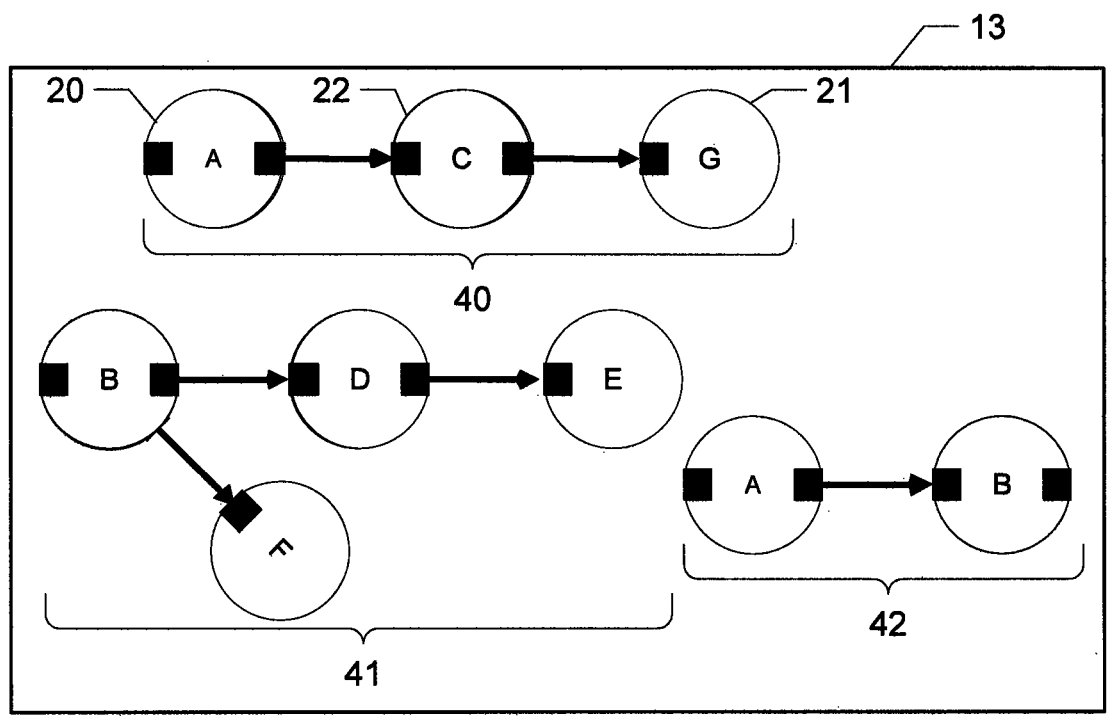
FIG. 3 is a block diagram illustrating a set of trees comprising links in accordance with an embodiment of the invention.

FIG. 3 is a block diagram illustrating a set 13 of trees 40-42 comprising links 34-39 in accordance with an embodiment of the invention. A sub-set of one or more links composed in this fashion generates a "tree" which is a tree-like structure constructed such that it is also a DAG. FIG. 3 shows a set 13 of trees 40-42. A tree is composed by joining the one or more links at their respective common nodes or "intersects". For example, link 35 and link 39 in FIG. 2 have a common node 22 that when joined generates tree 40 in FIG. 3. A single link may also be a tree such as tree 42. At this level 430, its definition as a tree replaces its definition as a link from the previous level 420. Any given tree comprises a sub-set of all links 34-39 that are connected via intersects. The selection of the members of a set depends on the details of the system 800 against which this model 400 is applied. The span of this level 430 includes compound objects, each comprising one or more objects from the previous level 420, up to the maximum size specific to this level.

This next level 430 represented by set 13 comprises all such trees and does not include any links that are not a component of at least one tree. Each tree has a unique identifier (e.g., 40, 41, 42) and uniquely comprises a set of links, their intersects, and any other elemental attributes. A generative operator $g_3$ 435 between this level 430 and a subsequent higher level 440 composes sub-sets of one or more trees such that each tree has an intersect with at least one other member of the sub-set.

Figure 4:
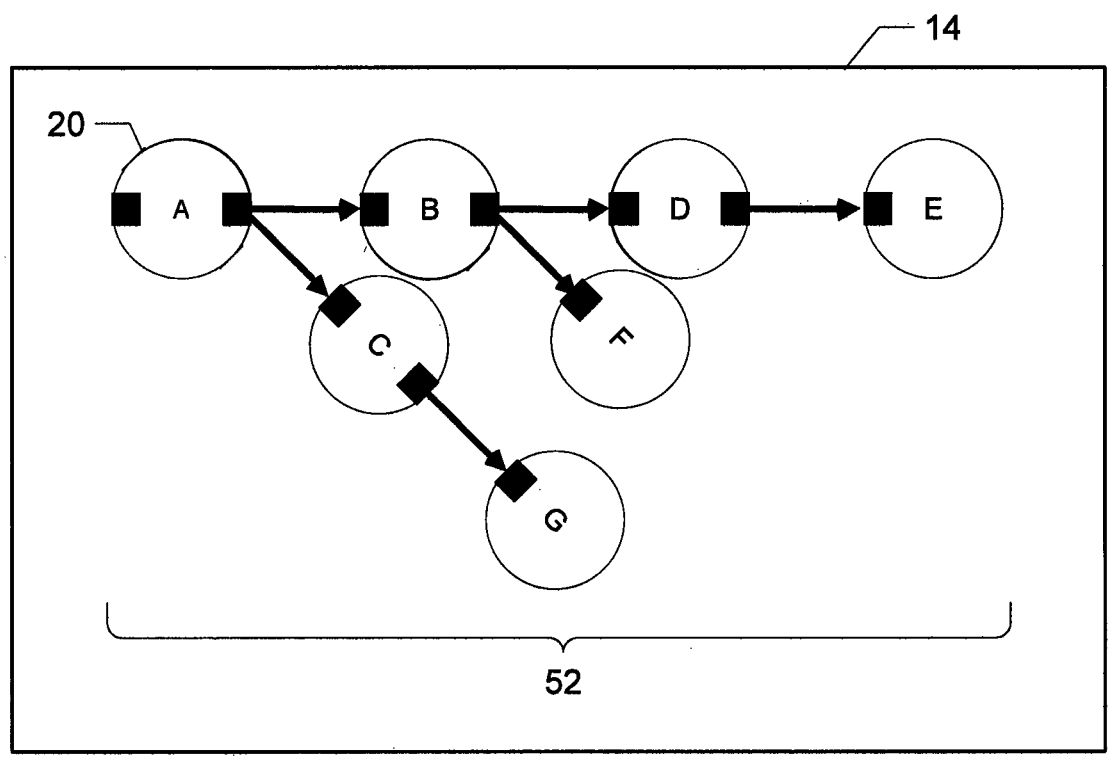
FIG. 4 is a block diagram illustrating a maximal tree comprising trees in accordance with an embodiment of the invention.

FIG. 4 is a block diagram illustrating a maximal tree 52 comprising trees 40-42 in accordance with an embodiment of the invention. Subsequent higher levels 440 of the hierarchical model 400 comprise compound trees composed of one or more trees from the previous level 430. A "maximal tree" (see below) is a type of compound tree. A "compound tree" may be composed of a single tree wherein its definition as a compound tree replaces its definition as a tree from the previous level. More typically a compound tree is composed of several trees joined at their respective intersects. FIG. 4 shows a set 14 comprising one compound tree 52 composed from trees 40-42 from FIG. 3. The hierarchical model 400 supports zero or more intermediate levels of compound objects as required by the system against which it is applied. Each has a generative operator $g_4$ 445 similar to the previous, selectively generating compound objects on the basis of each constituent having an intersect with at least one other constituent. At each level, the objects are considered a type of compound tree uniquely associated with that level. The span of each level ranges from the minimum sized object from the previous level up to a maximum size composed from the size and number of objects available.

The penultimate level 450 of the hierarchy 400 defines a set of terminal objects that are compound trees that are maximally compounded (are not sub-trees of any larger compound tree at a higher level). FIG. 4 shows a set 14 that is an instance of a set of one "maximal tree" 52. Maximal trees 52 include a node designated as the root or origin such as node 20 of maximal tree 52. The set may contain only a single maximal tree that is composed of all selected trees from the previous level set 13. In other instances, there will be two or more maximal trees such that each has a unique initiating link and each may share some or all of the trees from the previous level (i.e., they may not be disjoint). The span of this level is also maximal insofar as no larger objects are composed from its members, the members typically extending across the full breadth of the system 800.

Each of the links 34-39, trees 40-42, compound trees (none shown that are not maximal trees in FIG. 4), and maximal trees 52 constitute a directed acyclic graph ("DAG") with a root node 20. The root node 20 of each maximal tree 52 represents an origin for a transactional process traversing the graph. A given maximal tree 52 may comprise some of the same nodes, links, or trees as another maximal tree in the same set. In that regard, a maximal tree may partially overlay another at a given level of the hierarchy. For example, a maximal tree may share some of the same links or trees (and therefore nodes) as another but overall the maximal trees are distinct in their composition.

Figure 5:
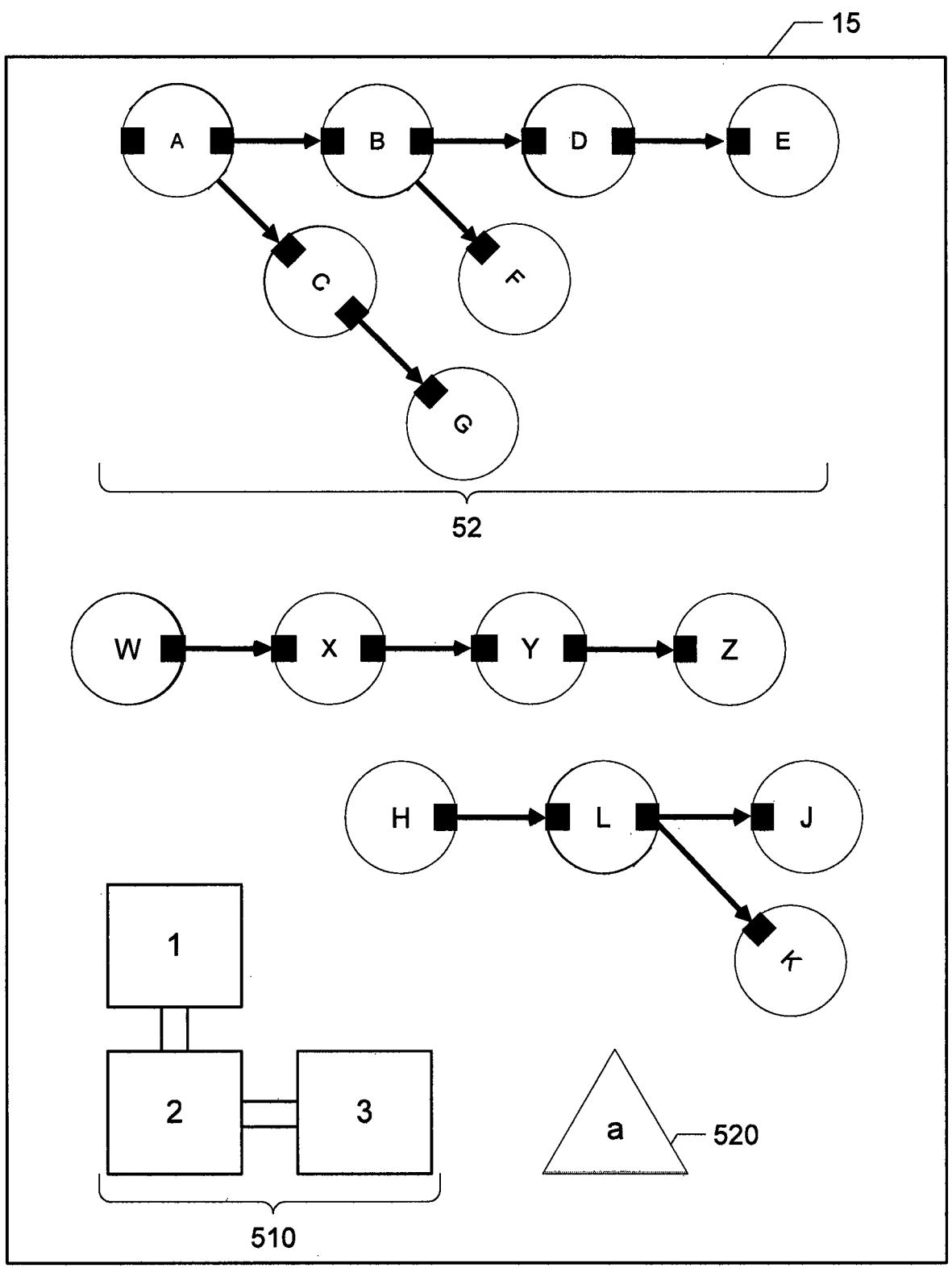
FIG. 5 is a block diagram illustrating a set of maximal trees and other non-tree objects in accordance with an embodiment of the invention.

FIG. 5 is a block diagram illustrating a set 15 of maximal trees and other non-tree objects in accordance with an embodiment of the invention. The highest and terminal level 460 of the hierarchy encompasses the set of all sets of maximal trees. FIG. 5 shows a set 15 of objects including maximal tree 52 and other objects 510, 520 not derived from nodes 21-27, links 34-39, or trees 40-42. The set 15 may be referred to as a "forest" (but the union is not necessarily disjoint, as required in set theory). This level 460 is defined as a generic container for all related objects and events, even though some of the relationships may not be expressed within the model 400, and has flexible degrees of constraint on its membership. This level is atypical insofar as it is not entirely isomorphic with the other levels or entirely derived from them. It may be optionally applied as required.

With respect to actors, functions, properties, and generative operators, each level of the model 400 defines additional attributes. These include: (1) "Actors" which are a population of users or stakeholders that operate on that level or perspective of the overall system. For example, end-users interact with the user interface of an application, while network operators focus on the messages passed over network connections; (2) "Functions" which are events within the system that represent instances of functional activity of one or more different types. The types belong to a class of functions that describe how the entities operate at a given level. A function at a higher level can be described as a composite of functions at a next lower-level. For example, high-level user transactions may be instances of user-level operations such as "delete item" or "view search results", while a lower level network transaction may be part of set of simpler operations such as "data transfer" or "get value"; and, (3) Objects and events at each level may be optionally described as having a variety of distinguishing "properties". These properties offer a flexible means of mapping the model into a real system and capturing additional features. As described, objects at each level are composed from objects from a preceding level. One or more "generative operators" is associated with each level that define how higher level objects are composed. A generative operator may be a simple list or set of construction steps, or it may be a complex function operating on the various attributes of the objects or the events that the objects are associated with. For example, the association of a set of links into a tree corresponding to a "service" may be based upon the discovery of the attributes of events on a given link, such as the contents of messages between nodes.

With respect to mapping to an IT system topology 810, the model 400 may be applied to a distributed IT system 800 composed of a plurality of running processes on a plurality of distinct servers (e.g., similar to 300) that communicate via a plurality of network connections. The levels 410, 420, 430, 450, 460 of the hierarchy 400 are selected to correspond to individual components 401, network connections 402, resources or services 403, applications 405, and business processes 406.

Consider a typical IT system 800 using an Internet Protocol ("IP") network. There are a plurality of devices (e.g., similar to 300) with operating systems running processes in physical or virtual machines, each of which may be considered a node (e.g., 20). The process(es) running on a node may be configured to connect via the network 351 to other processes running on specific other nodes. These configured connections are the links (e.g., 34) within the system. A link may be uniquely designated by a 5-tuple comprising the Layer 3 source and destination IP address, the Layer 4 source and destination port, and the application protocol. That is, $\text{Link}_i = (\text{IP}_{src}, \text{IP}_{dst}, \text{Port}_{src}, \text{Port}_{dst}, \text{Protocol})$.

The choice of source and destination define the direction of the link, where direction refers to the initial message sent between the nodes such that the source is considered the point of origination for the subsequent bidirectional exchange of messages. For the same IP addresses, ports, and protocol, reversing source and destination refers to a distinct link. Network and server managers who are responsible for network integrity and performance may be identified as key actors with respect to this link construct.

Within an IT system 800, a set of one or more links may represent a single coherent resource or "service". For example, a set of inter-operating nodes may operate as a datacenter. The set of links associated with the datacenter maps to a tree with the root link defining its access point. Similarly, another group of links may act as a Web service comprising all network connections between multiple load-balanced servers and all potential clients. Each service represents a distinct and coherent part of a complete system which offers well-defined functionality.

An arbitrary set of links does not necessarily compose a service. A service is defined by its functionality. That functionality often may be defined by and accessed via a programmatic application programming interface ("API"). A program developer may incorporate a service into a distributed software program by instantiating access to it through the API. The program would then be configured to access the service via a specific link. The generative operator that composes services from links may be a simple list of intersections between links or it may be a functional operator based on link or link class attributes (e.g., ranges of IP addresses connect to other ranges of IP addresses). Developers and systems integrators who are responsible for the implementation of specific application features may be identified as key actors with respect to the service construct.

An IT system 800 supports one or more "applications" which are composed of one or more of the services within the system. The application is employed by a population of users who access the application through an interface service. For example, an interface service might be a browser client running on a wireless device (e.g., 300) connecting to a Web server (e.g., 300). The overall application includes other services that are subsequently invoked by the interface service. The generative operator that composes applications from services may be a simple list of connections between services or it may be a functional operator based on service attributes. End-users and customer satisfaction agents who are concerned about and responsible for the overall operation and performance of the applications may be identified as key actors with respect to the application construct.

The IT system 800 is implemented and maintained by a "business" that employs the one or more applications to effect its business processes. A business comprises a number of different roles, resources, tools, and processes that are marshalled to achieve a set of business goals. The relationship between the business and the applications that it deploys are typically governed by the users within the business and their roles in serving the business goals. The IT system 800 may fully express one or more processes of a business but typically they are only an aspect of an overall business. Line-of-business and business performance managers who are responsible for the successful operation of the business may be identified as key actors with respect to the business construct.

With respect to the details of the IT system 800, according to one embodiment, a node maps to a running process on a network-connected server. A node then has at least one IP address associated with it. A link maps to a pair of such nodes communicating via a network connection, identified by their respective IP addresses, the direction of communication flow (i.e., which node initiated the connection), the respective network ports in use, and the one or more application protocol(s) in use.

Further, sets of nodes may be logically mapped to "node classes". All nodes within a node class may be considered functionally similar. For example, a node class may be the set of all possible Internet clients connecting to a given Web server. The set may contain an explicit list or range of IP addresses, ports and protocols, or may simply be described conceptually, for example, any device that connects to a given node using port 80. The members explicitly belonging to a node class may vary in time. For example, the current instances of clients connecting to a given Web server are a finite sub-set of an otherwise very large, unknown set of potential members. In other cases, a node class may be comprised of fixed and constant list of members.

Similarly, a link may be logically mapped to a "link class". A link class comprises all links defined by two node classes. A link may be defined by a 5-tuple comprising source address, destination address, source port, destination port, and protocol. Each field in a 5-tuple definition may be a specific value, a discrete set of values, a range of values, or all possible values. A similar 5-tuple definition represents a link class. For example, the link class (10.0.0.*, 192.168.1.2,*, 80, HTTP) represents all links from any source IP address prefixed by 10.0.0.* that connects to the destination address 192.168.1.2, from any source port, to port 80, using HTTP. A particular example that matches this description is referred to as a "link instance".

According to one embodiment, the hierarchical model 400 contains five levels 410, 420, 430, 450, 460 of entities that map a typical distributed, network-based IT system 800 as follows: (1) Network node/device (node) 401 which is a process running on a physical or virtual host with at least one network interface. The network node is identified by its network interface address (e.g., IP address). This is a device level entity with a span limited to the device. A "network node class" may be defined by a specific or potential set of network nodes; (2) Network link (link) 402 which is a Layer 3/4 (e.g., TCP/IP) network connection bounded by a node at either end. Communication along the network link is initiated by one of the nodes (the source) to the other (the destination). If either node acts as a source, then each direction may be considered a separate link. A link is uniquely designated by a 5-tuple comprising source address, destination address, source port, destination port, and protocol. A single link may incorporate multiple protocols but more typically each protocol represents a separate link. This is a network level entity with a span of a node pair and a network connection (a link). A "network link class" may be defined by a specific or potential set of network links. A network link class is uniquely designated by its 5-tuple where one or more of its fields are represented by a list, range or wildcard of values; (3) Service (tree) 403 composed of one or more links or link classes. It is further composed of a list of shared nodes (i.e., intersects) or node classes that connect the links or link classes into a DAG. Parent, access, or initiating link (or link class) are supported. The source node(s) (or node class) in the initiating link (or link class) acts as the root node (or node class) for the service. API level entities with a span of one or more links, up to defined service boundaries, are supported; (4) Application (maximal tree) 405 which are composed of one or more services and thus indirectly composed of one or more links or link classes. It has a parent, access or initiating service which is the root service for the application. The parent or initiating link (or link class) within that service is the root link (or link class) for the application. The source node (or node class) in the initiating link (or link class) is the root node (or node class) for the application. The root service represents the interface service for a specific population of end-users. End-user level entities with a maximal span, extending across the end-to-end system, are supported; and, (5) Business (set of all maximal trees) 406 which is composed of all applications, as well as other related aspects of the business, and may describe relationships or inter-operation between applications. Relationships are not mediated by network connections. Business-level entities beyond the span of the network topology are supported.

Thus, the sets 10, 12, 13, 14, 15 described above may represent levels 410, 420, 430, 450, 460 of the hierarchical model 400 of the UTM.

With respect to events within the model 400, typically messages pass between two nodes (e.g., 110, 113 in FIG. 8) across a network link of an operational system 800. The network traffic associated with the messages may be passively monitored and subsequently decoded and analyzed for their contents by a monitoring system (e.g., 300). According to one embodiment, network traffic may be detected and monitored at the network interface (e.g., 350) or within the operating system of each node through the use of network shims or other modifications to the node software. According to another embodiment, network traffic may be monitored at a network proxy through which the network has been configured to pass messages. According to another embodiment, application messages may be directly detected and monitored within the processes running on the nodes. According to another embodiment, other equivalent means of gathering the application messages that are subsequently assembled into transactions may be used.

In terms of the standard ISO Layer model, monitored network traffic may take the form of Layer 3 (network) protocol data units ("PDUs") which, for the example of an IP network, are IP packets. In an IP network, Layer 3 packets are automatically assembled by the network stack of the monitoring interface from Layer 1 (physical) PDUs, or bits, into Layer 2 (data link) PDUs, or frames, and finally into packets. Subsequently, monitoring software may select from the observed packets and aggregate them according to their Layer 3 attributes such as source and destination IP address. Using rules specific to the transport protocol, the software may then assemble the packets into Layer 4 (transport) PDUs, for example, TCP segments in a TCP/IP network, and record their attributes.

There may be a further one or more protocols that correspond to other layers higher in the ISO model such as Layer 7 (application). There may also be additional layers corresponding to Layers 3 and 4. The monitoring software (e.g., 331) may then implement the rules for each subsequent protocol to further assemble PDUs from the previous protocols PDUs. The monitoring software 331 can further record attributes for each protocol and its PDUs. Typically there will be a final protocol that is an application layer protocol whose PDUs are the messages exchanged by the processes running on each node.

Under specific rules governing message correlation, subsets of the network messages are selected and associated together. In general, their association corresponds to a network request/response event and consequently defines a transaction. The association of messages is with respect to a given link and thus this is a "link transaction". A link transaction comprises the elements of a bounded exchange between two nodes representing a particular functional act. The definition of a particular exchange derives from the protocol in use. A given protocol may support a variety of different functionalities such as keep-alive, authorization, data transfer, query-response, and the like. A specific link transaction may then be identified by functional type.

In a typical IT system 800, one or more links or link classes may be configured to provide a specific service. Examples of services might include identity verification, search engine, backup and recovery, payment processing, or any other high level capability that requires a dedicated collection of resources. Each link within the service may perform some low-level activity in support of the higher level service functionality.

Figure 6:
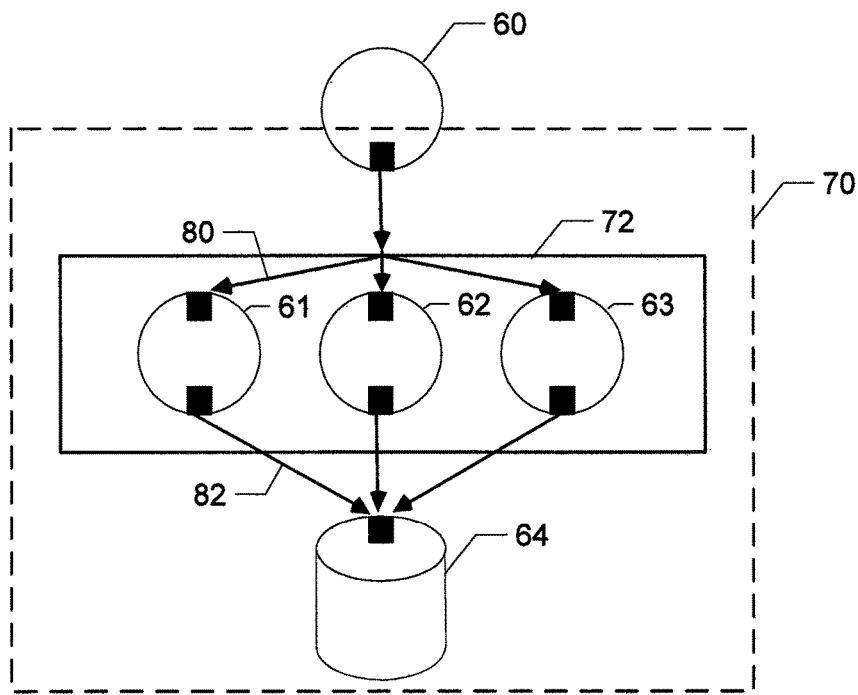
FIG. 6 is a block diagram illustrating an exemplary search engine service in accordance with an embodiment of the invention.

FIG. 6 is a block diagram illustrating an exemplary search engine service 70 in accordance with an embodiment of the invention. For example, in the case of a search engine service, the overall service functionality may be labelled "resolve complex data query". FIG. 6 shows a set of nodes 60-64 configured as a search engine service 70. In order to ensure the stability and scalability of such a service, two or more processing nodes may be load balanced together, offering a single front-end to other services that require this functionality. The set of nodes 61-63 represent load-balanced nodes and form a node class 72. The individual nodes 61-63 receive requests for various kinds of complex data queries from node 60 and process them. The individual nodes 61-63 communicate directly with a common database 64. The nodes 61-63 are capable of maintaining caches of data from the database 64, optimizing queries into specific combinations of sub-queries, and other forms of logic that improve their performance over a simple database.

Within a defined service, processing a specific incoming request may result in a number of lower level requests being passed across specific links within the service. Within the search engine example, a search engine service 70 has been implemented within a distributed application which has some aspect running as a process at node 60. An incoming complex data query originating from node 60 may be passed to a processing unit at node 61, defining a link transaction across the link 80. As a consequence of processing, node 61 may send one or more requests to the database 64, resulting in one or more sets of messages exchanged that compose one or more link transactions across link 82. There is a causal relationship between the link transaction between nodes 60 and 61, and the one or more link transactions that pass between nodes 61 and 64. The set of related link transactions taking place on links within the search engine service 70 may be generated, forming a higher level transaction taking place across the service 70. This higher level transaction is a "service transaction" insofar as it occurs across the span of the defined service 70.

In general, service transactions are composed of one or more link transactions across one or more links within a defined service. It is possible for a service to have only one link and for a service transaction to be composed of only one link transaction. A service may be defined by its functional description at an API level, that is, a service is typically implemented by an application developer through calls to an API and subsequently configured by a systems integrator as part of a larger system. Different API calls may be possible, and/or with different arguments, resulting in different types of service transactions being generated. Each type of service transaction may potentially be composed of different combinations or sequences of link transactions.

In an IT system 800, one or more services compose an application. By definition, according to one embodiment of the invention, at least one of the services is an "interface service" that is used by a population of end-users to employ the application. "End-user" typically denotes a human interacting with an interface but may also be an automated agent, an independent application, or a business process mechanism. An end-user may execute a specific function of the application through the interface service that causes specific service transactions on various of the services comprising the application. This set of related service transactions comprises an "application transaction" that represents an instance of the executed application function. An application is defined by the interface service, the specific end-user population, and the functionalities that the end-user has access to through that interface service.

An example application might be an ATM banking application. It may be composed of an end-user ATM device connected through a dedicated network connection to an ATM network service, and subsequently connected to a debit banking service, and finally to a specific bank. The "interface service" is the ATM device itself connected to the ATM network. Through the ATM, the end-user employs a small set of functionalities such as: authorize access; view balance; withdraw money; deposit funds; and print receipt as a record of the transaction.

Actions at the ATM interface cause a service transaction to take place within the ATM service. Consequently, a service transaction also occurs within the banking service and possibly within other inter-connected services as well. Collectively, the set of service transactions represent an application transaction which results in the end-user achieving a "business task" (such as withdrawing money).

A business task is synonymous with an application transaction when the application fully incorporates all aspects of the business task. Consider an exemplary scenario where an ATM cannot accept physical deposits directly but only registers an intent to deposit and the end-user is required to mail the funds to the bank for processing. In such a case, the ATM application transaction of depositing would not be synonymous with the completed business task. The end-user would then see two distinct steps in the business task, namely, registering a deposit via application and mailing the funds. In general, ATMs do not operate in this fashion and so this is described for illustration purposes only. However, it is often the case that, when an end-user deposits funds through an ATM, a human agent of the bank or ATM network must later extract the envelopes of deposits and clear each of the recorded deposit transactions. In this case, the human agent acts as a "clearing service" that is part of the overall ATM application. In this case, the bank would view the business task as comprising two distinct steps. From the perspective of the bank, the definition of business task may be different from that of the end-user or bank customer.

Figure 8:
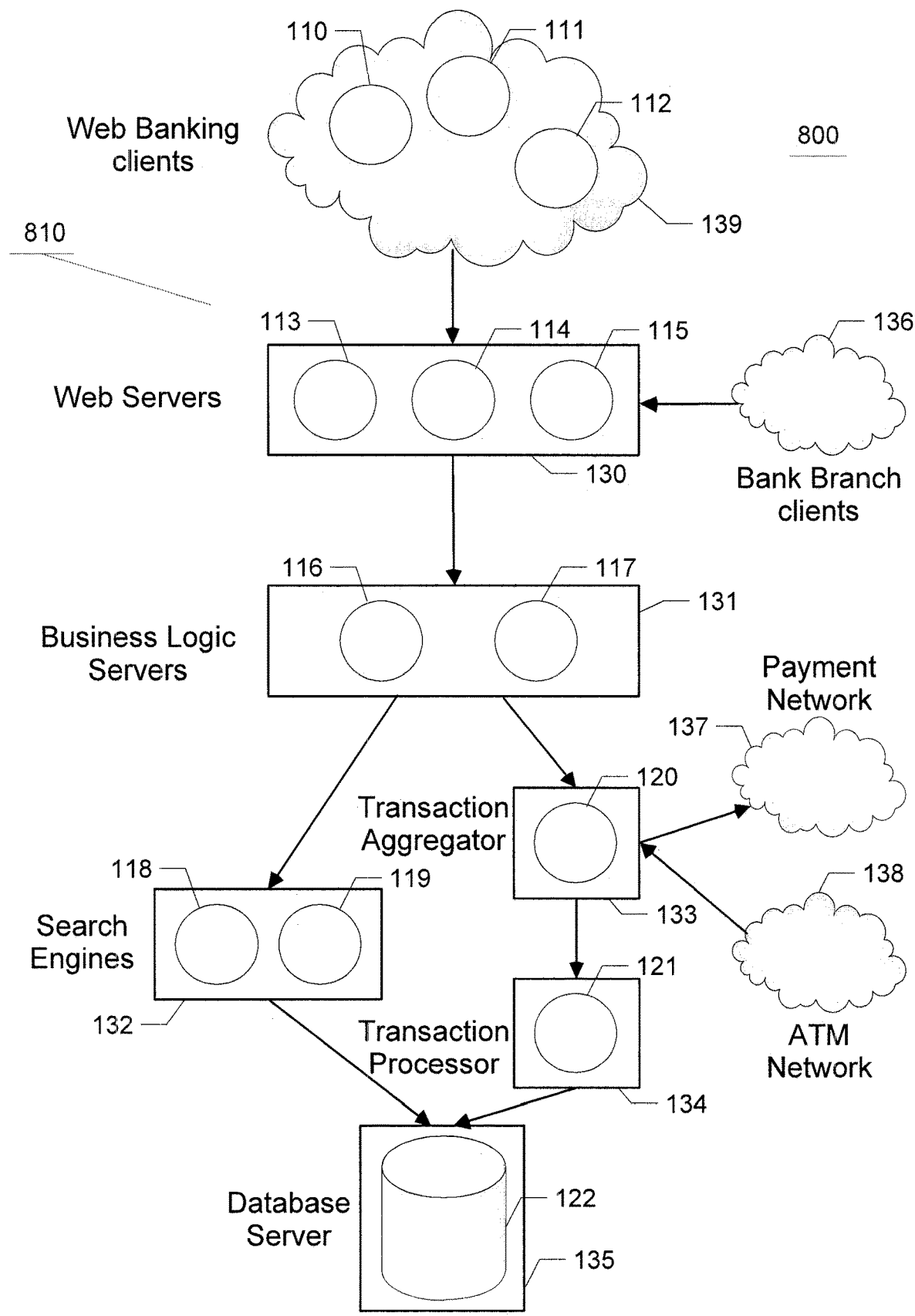
FIG. 8 is a block diagram illustrating nodes and node classes of a simplified banking IT system in accordance with an embodiment of the invention.

FIG. 8 is a block diagram illustrating nodes and node classes of a simplified banking IT system (or application system) 800 in accordance with an embodiment of the invention. With respect to mapping for an IT system 800, the following is an example of how a distributed system 800 may be mapped into the UTM (i.e., the hierarchical model 400 in FIG. 16 for example). FIG. 8 shows a simplified sample logical implementation of a small bank's IT system 800. FIG. 8 sets out the network topology 810 of the IT system 800.

The first step is to identify the nodes of the IT system 800 and their related node classes. In the example system 800, there are three instances 113-115 of a Web server running that are load balanced together to appear as a single logical Web node or node class 130. As well, there is an uncountable population of customer Web clients including clients 110-112 that represents a node class 139. Similarly, other nodes form nodes classes 131-135. The clouds 136-138 do not show example nodes but similarly represent node classes. Each node class 130-139 employs one or more protocols to communicate with other nodes classes. The node classes 130-139 are as follows: Web servers 130; Business logic server 131; Search engine 132; Transaction aggregator 133; Transaction processor 134; Database 135; Branch Web clients 136; ATMs 137; Payment network payees 138; and, Customer Web clients 139.

Figure 9:
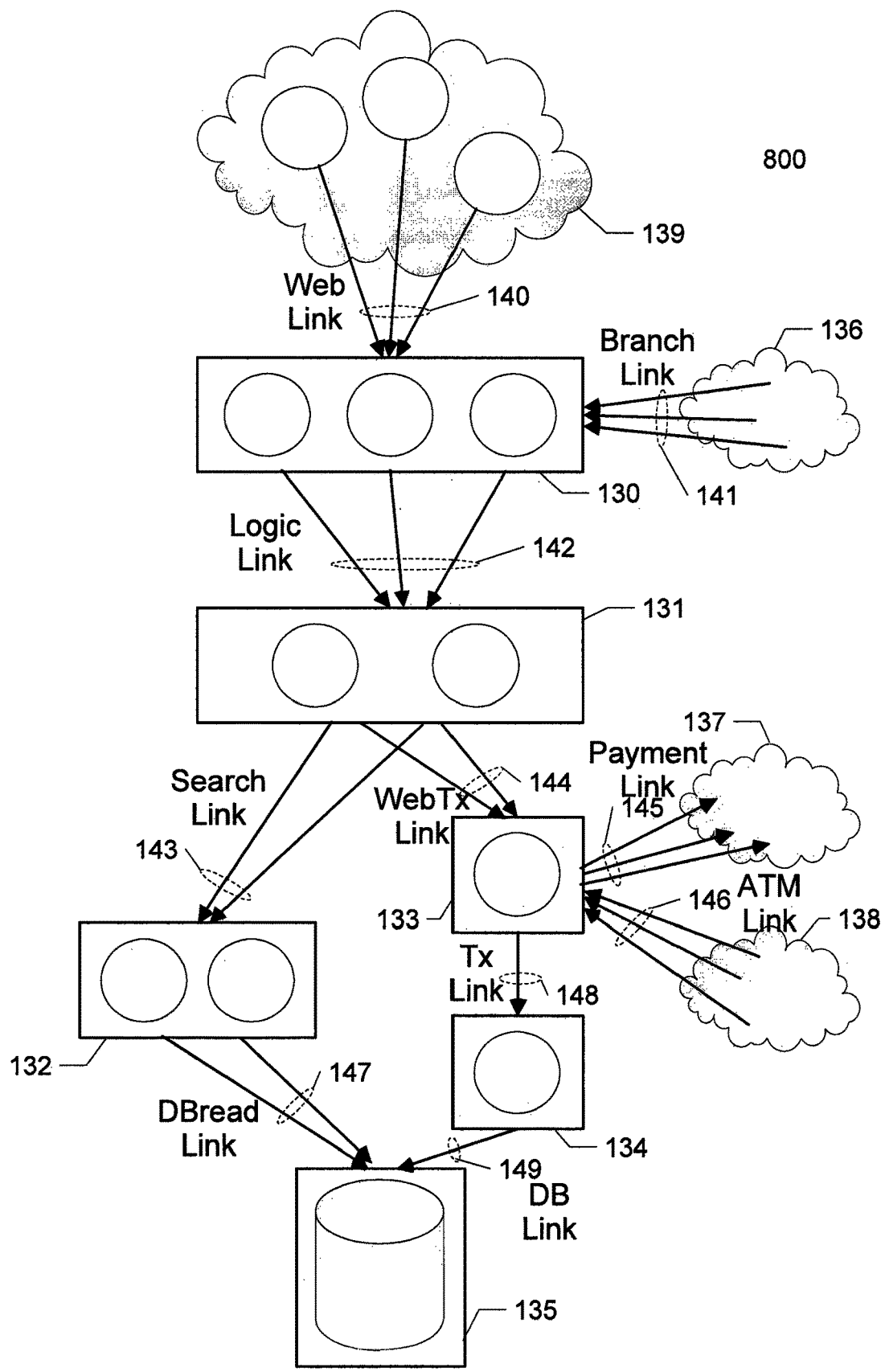
FIG. 9 is a block diagram illustrating link and link classes of the simplified banking IT system of FIG. 8 in accordance with an embodiment of the invention.

FIG. 9 is a block diagram illustrating link and link classes of the simplified banking IT system 800 of FIG. 8 in accordance with an embodiment of the invention. These node classes 130-139 are joined together to form links and link classes with one node class acting as the initiating side. FIG. 9 shows the same IT system 800 as FIG. 8 but only illustrates the links and link classes composed from the node classes. For example, the set of all possible links between node class 139 and node class 130 form a link class 140. Similarly, each one or more potential links between each node class forms a link class as follows: Web Link 140 (139→130); Branch Link 141 (136→130); Logic Link 142 (130→131); Search Link 143 (131→132); WebTx Link 144 (131→133); Payment Link 145 (133→137); ATM Link 146 (138→133); DBread Link 147 (132→135); Tx Link 148 (133→134); and, DB Link 149 (134→135).

Each link class employs at least one application layer protocol to facilitate the exchange of messages between the node classes. As well, it is assumed that there are other layers of protocols involved that facilitate network connections and data transport.

Figure 10:
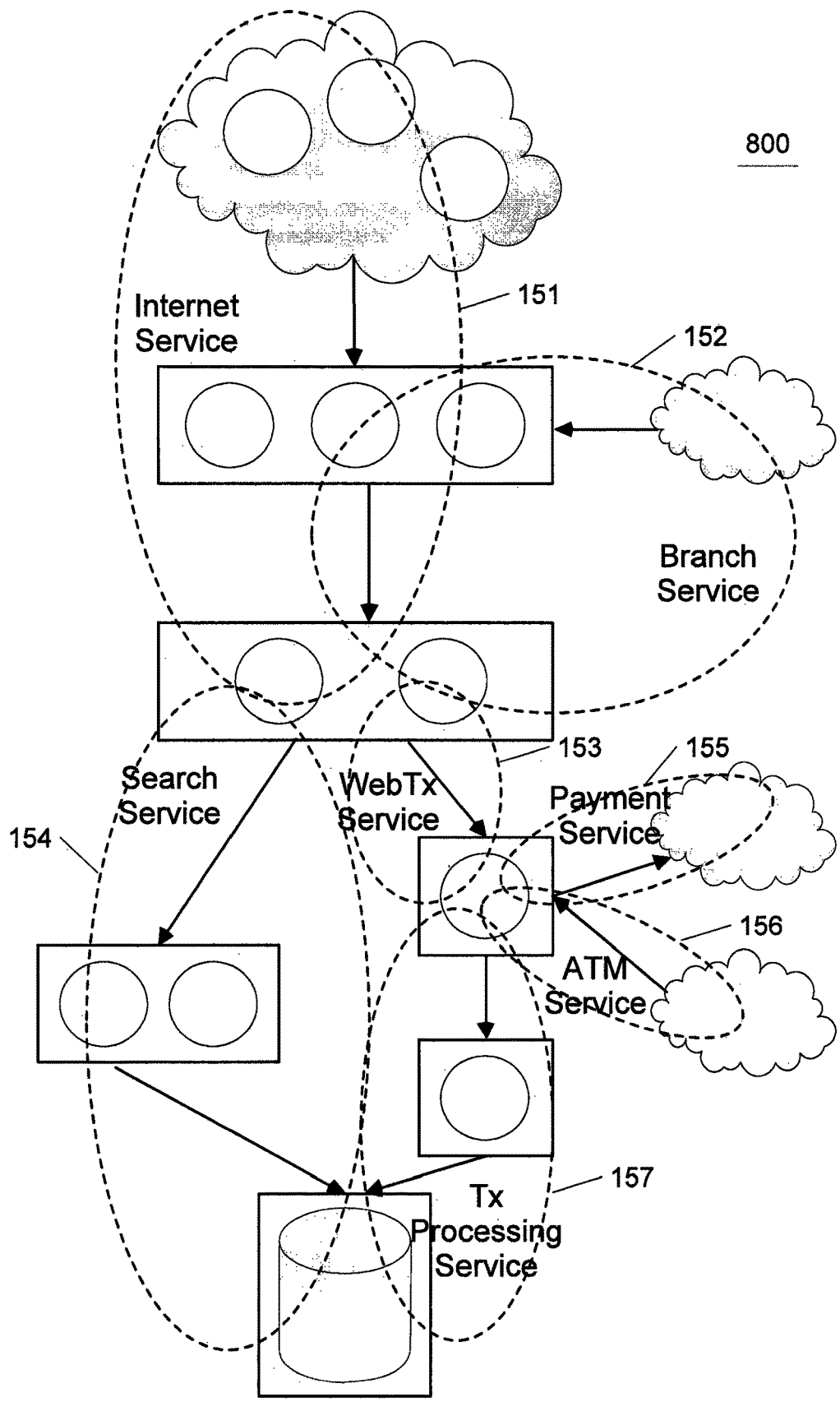
FIG. 10 is a block diagram illustrating services of the simplified banking IT system of FIGS. 8 and 9 in accordance with an embodiment of the invention.

FIG. 10 is a block diagram illustrating services of the simplified banking IT system 800 of FIGS. 8 and 9 in accordance with an embodiment of the invention. Defining the services from the link classes depends on how the IT system 800 has been implemented by developers and system integrators, and how it is operated. FIG. 10 shows a particular set of defined services 151-157 that reflect an exemplary implementation in which the ovals approximately indicate which link classes (and node classes) are included in each service. The defined services are as follows: Internet Service 151 (140→142); Branch Service 152 (141→142); WebTx Service 153 (only 144); Search Service 154 (143→147); Payment Service 155 (only 145); ATM Service 156 (only 146); and, Tx Processing Service 157 (148→149).

The intersects for each of the services are the shared node classes between the component link classes. For example, referring to FIGS. 8-10, the Web Servers node class 130 is the intersect between the Web Link 140 and Logic Link 142 of the Internet Service 151.

Figure 11:
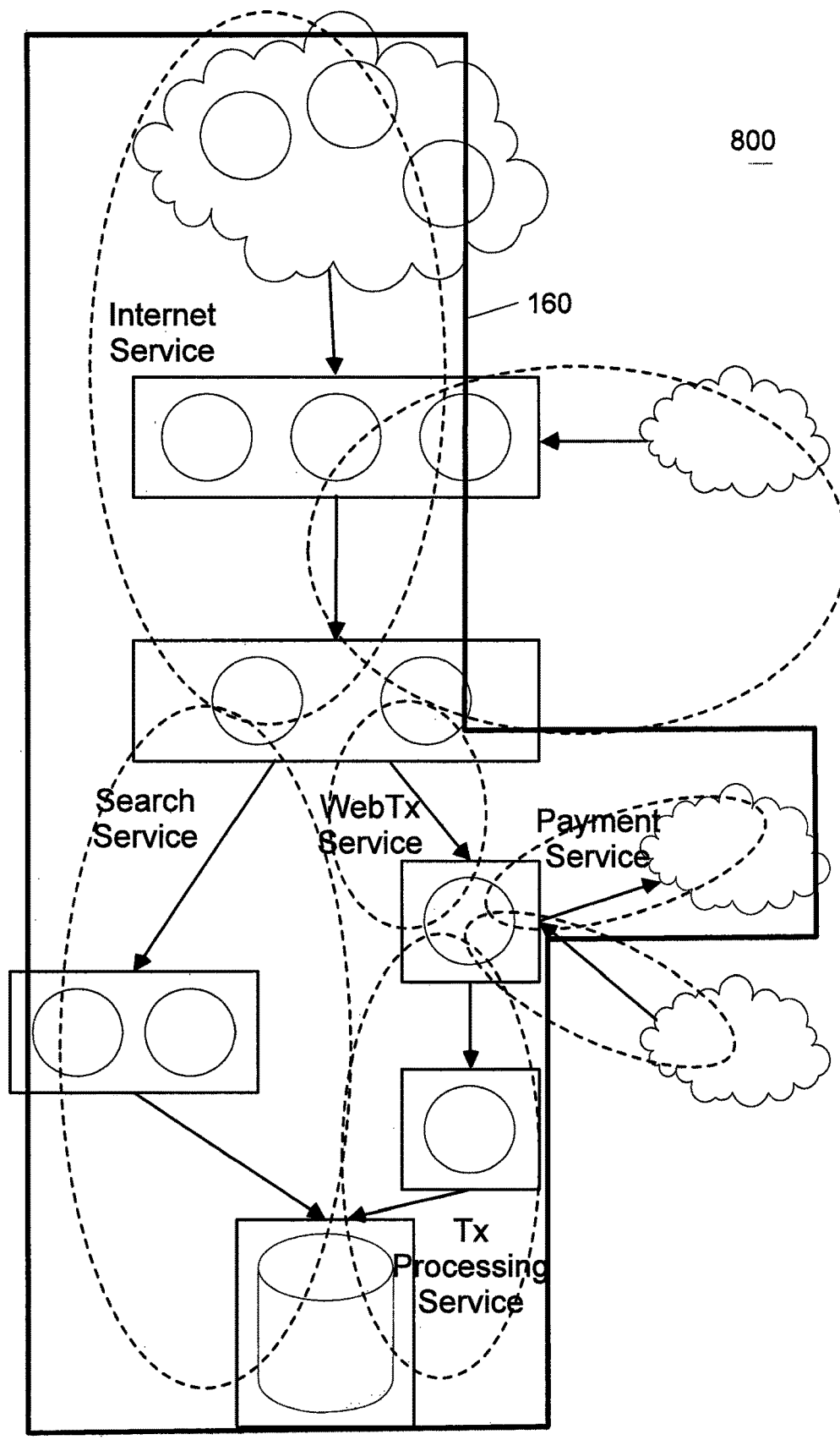
FIG. 11 is a block diagram illustrating a web application of the simplified banking IT system of FIGS. 8-10 in accordance with an embodiment of the invention.

FIG. 11 is a block diagram illustrating a web application of the simplified banking IT system 800 of FIGS. 8-10 in accordance with an embodiment of the invention. Based on the various populations of users, a number of applications may be identified, each composed of one or more services, and, in part, defining a business. Only the Internet Application 160 is shown in FIG. 11. The three applications are as follows: ATM Application (156→157) (i.e., customers using ATMs); Branch Application (152→{153→{157, 155}, 154}) (i.e., branch tellers acting on behalf of customers);

and, Internet Application 160 (151→{153→{157, 155}, 154}) (i.e., customers accessing via the Web).

The intersects between each service define how they are inter-connected and which nodes are involved. For example, the Transaction Aggregator node class 133 is the intersect between each of the ATM Service 156, Payment Service 155, WebTx Service 153, and Tx Processing Service 157. The Internet Application 160 involves five of the seven defined services. The population of customers accessing the bank through the Web via the initiating Internet Service 151 defines this Application 160. The two other not included services are both initiating services that act as access services for other populations of end-users. The set of three distinct applications composes the bank business. The bank business may also be defined as including other IT systems, human agents and processes, and many other instruments and tools. The business level may represent the relationships between applications and these other non-application entities. Although not fully isomorphic with the other levels, the business level is essential to capture the human context that the IT system 800 operates in relation to.

With respect to businesses, the hierarchical model 400 also extends into the socio-economic realm of human users, managers, and operators. In this embodiment of the invention, a business is the highest level 460 of the model 400 and includes all applications that are deployed in the IT system 800. The IT system 800 is itself an aspect of a business. Businesses are complex sets of interacting elements including: applications; human agents of the business; human customers or beneficiaries of the business; documents and other non-IT data-bearing instruments; various encodings or descriptions of processes; physical property and other assets; funds and resources; intellectual property; and, aspects of other businesses including applications, human agents, any other aspects typically shared with 3rd parties.

A business is defined to have "business goals". These are a set of objectives that the business is organized to achieve efficiently as a necessity of its socio-economic existence and success. Business goals are achieved through "business processes" that define the employ and interaction of the various elements of the business. Business processes are a prescribed series of steps or actions to be taken, employing tools and/or resources, often with business logic associated with the steps to account for contextual dependencies. In particular, a business process may be, either wholly or in part, expressed by the deployment of an application within an IT system 800. From the Internet Application 160 example described above, a business process involving the use of specialized user interfaces (e.g., Web browsers) and business networks can be identified that facilitates the business goal of enabling banking customers to remotely manage their funds held by the bank.

A business process describes one or more "business tasks" to be executed either serially or in parallel, with or without dependencies between each task. In the Internet Application 160 example, one business process might be defined as "enable banking customers to manage their banked funds remotely", which could include a large number of optional steps, depending on decisions made by the customer. An instance of the business process might include the application-level steps of: Login; Authorize access; Get account balance; Transfer funds; Pay bill; and, Logout.

When a step in a business process is wholly implemented within an application, execution of the step corresponds to an application transaction. Each step may correspond to a business task as well. In this case, each application transaction is then identical with a business task. More generally, a business task may also be defined to include more than one application transaction or, where the business process is not wholly implemented in an application, may include executed steps that are outside of the application.

Figure 7:
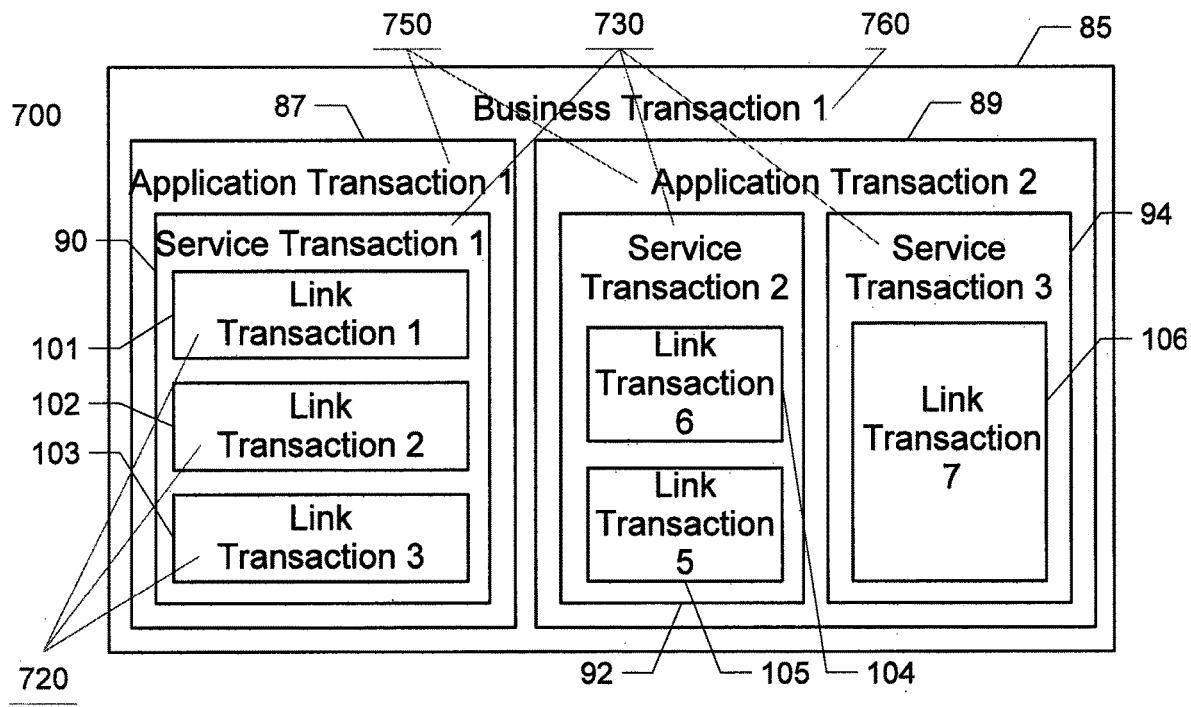
FIG. 7 is a block diagram illustrating nested transactions defining a top-level business transaction in accordance with an embodiment of the invention.

FIG. 7 is a block diagram illustrating nested transactions 700 defining a top-level business transaction 85 in accordance with an embodiment of the invention. With respect to transaction construction, in the hierarchical model 400 into which a specific IT system 800 is mapped, the events or transactions 720, 730, 750, 760 at each level 420, 430, 450, 460 are constructed or correlated from the events or transaction at the preceding level. Note that a transaction, as described above, is a kind of event. In FIG. 7 an example business transaction 85 (i.e., Business Transaction 1 85) is shown that includes two application transactions 87, 89 (i.e., Application Transaction 1 87 and Application Transaction 2 89). Each application transaction 87, 89 includes one or more service transactions 90, 92, 94 (e.g., Application Transaction 2 94, for example, includes Service Transaction 2 92 and Service Transaction 3 94). Each service transaction 90, 92, 94 includes one or more link transactions 101-105 (e.g., Service Transaction 2 92, for example, includes Link Transaction 5 105 and Link Transaction 6 104). And, each link transaction 101-105 includes one or more protocol messages (not shown). Correlation generally refers to the construction mechanism for associating lower level events (e.g., events 101, 102, 103 of level 420) and assembling them together to form a higher level event (e.g., event 90 of level 430).

Transaction correlation comprises the means and mechanisms for associating records of transaction-related events into groups or sets. The associations are derived from relationships between events based upon their attributes and properties. The relationships are part of the ontological model 400 and are determined from knowledge of the specific IT system 800. Knowledge may include details such as the following: IP addresses of all interfaces of all nodes; IP ports configured for use by processes running on nodes (e.g., listening ports); protocols in use on which interfaces/ports; node classes (e.g., which nodes have common functionality); link classes (e.g., which links have common transactions and/or common protocols); shared nodes (e.g., which links have common nodes); implementation of protocols (e.g., general to all implementations; specific to the IT system under investigation; sequences of messages associated with a protocol operation); service boundaries (e.g., which links belong to a given service; which link(s) are the access interface(s) to the service); and, application implementation details (e.g., access service (e.g., which service acts as an interface to the end-user); end-user application functions (e.g., what the end-user can do at the interface).

This knowledge may be determined manually by humans through investigation of the IT system 800 or through disclosure from the developers or operators of the IT system 800. Some of the knowledge may be a priori such as that relating to certain protocols that are implemented in a standardized fashion. Alternately, the knowledge may be discovered by automated learning systems that are parameterized with pre-defined models of various kinds of IT systems, application types, and topologies. Or learning may be derived in an unparameterized approach that identifies unique, previously unknown behaviors of interest.

With this knowledge, rules can be implemented that correlate low-level events into higher level events. For example, in the case of monitoring network data traffic, the lowest level of events may be the arrival of network IP packets at a monitoring interface placed within the IP network of an IT system 800. The monitoring interface 350 may receive a copy of all packets arriving at all of the network interfaces within the IT system 800, such as when a SPAN (switched port analyzer) port is created on a network switch. With knowledge of IP addresses and the nature of the TCP and IP protocols, packets may be selected from the stream of arriving packets and grouped by timestamp, source and destination IP addresses, TCP sequence number, TCP port number, and the like. The monitoring system 300 can assemble IP packets into TCP segments, and subsequently assemble the segments into application protocol messages.

Messages being passed between a pair of nodes then might be isolated from other traffic and ordered by arrival. Knowledge of the application protocol in use and how it has been implemented then might identify request/response pairs (or longer sequences of messages) within that set of messages. For example, the header of the application protocol may include fields referring to a type of protocol message defining its role in a request/response exchange.

The appropriate messages may then be effectively selected out of the set and correlated into specific request/response sequences that constitute a link transaction. In some instances this may be done solely by sequence number, arrival timings, and protocol-specific header content. In other instances, the content of the protocol message payloads may be inspected to extract key attributes such as a unique identifier number or string that it is shared by all associated messages. Other means known to a person skilled in the art may also be employed.

Figure 12:
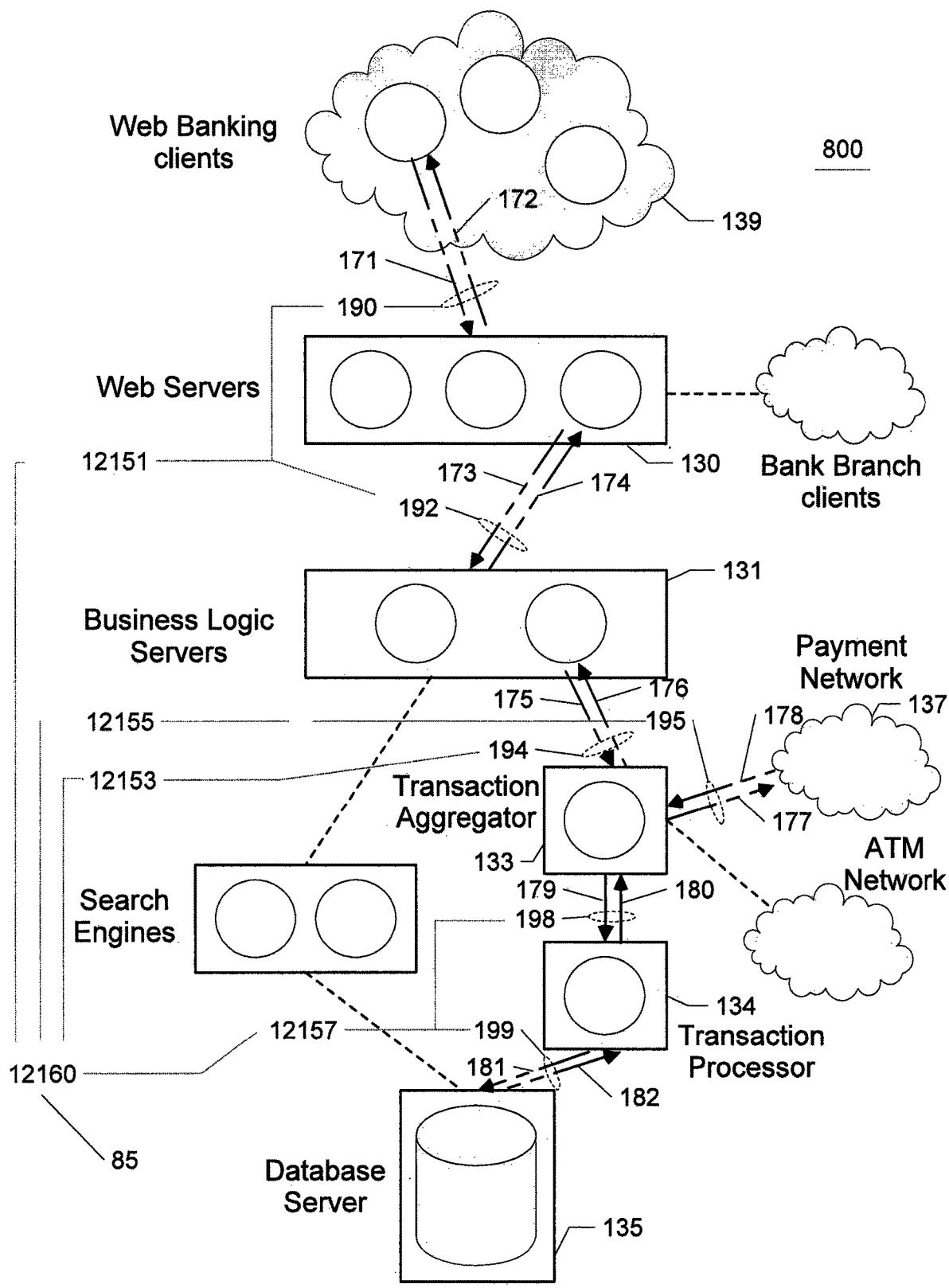
FIG. 12 is a block diagram illustrating an end-to-end application transaction traversing the links and services of the simplified banking IT system of FIGS. 8-11 in accordance with an embodiment of the invention.

FIG. 12 is a block diagram illustrating an end-to-end application transaction traversing the links and services of the simplified banking IT system 800 of FIGS. 8-11 in accordance with an embodiment of the invention. Consider the example of a banking customer using a Web browser to make a payment to a 3rd party such as a telephone company. In FIG. 12, the example IT system 800 shows a simplified set of request/response pairs 171-182 across a specific set of the links 140, 142, 144, 145, 148, and 149 (as shown in FIG. 9). The initial request 171 is generated by the end-user (i.e., the Web Banking clients 139). The request 171 is sent across Web Link 140 to the Web Servers 130. It in turn generates the request 173 across Logic Link 142 to the Business Logic servers 131. The request 175 is then sent across WebTx Link 144 to the Transaction Aggregator 133. It sends a request 177 to the Payment Network 137 where request 177 is resolved and response 178 is sent back. The Transaction Aggregator 133 then forwards a request 179 to the Transaction Processor 134 for account resolution. The Transaction Processor 134 resolves the financial payment against the customer's account, updating the Database Server 135 by sending request 181. The Database Server 135 responds with response 182, generating a response 180, which causes response 176, then response 174, and finally response 172 to complete the end-to-end transaction back to the end-user (i.e., the Web Banking clients 139).

Each response/request pair, such as 171 and 172, constitutes a link transaction 190. From successfully constructed link transactions 190, 192, 194, 195, 198, 199, it is subsequently possible to construct service transactions (e.g., 12151, 12153, 12155, 12157). Those causally related link transactions (e.g., 190, 192) within a given service boundary (e.g., 151) constitute a service transaction (e.g., 12151). For example, messages 171-174 constituting link transactions 190, 192 represent a service transaction 12151 within the Internet Service 151. The entire end-to-end set of request/response pairs constitute an application transaction (e.g., 12160) and are constructed by relating the service transactions (e.g., 12151, 12153, 12155, 12157) together. Similarly, business transactions (e.g., 85 from FIG. 7) may be constructed by relating applications transactions (e.g., 12160) together.

Figure 13:
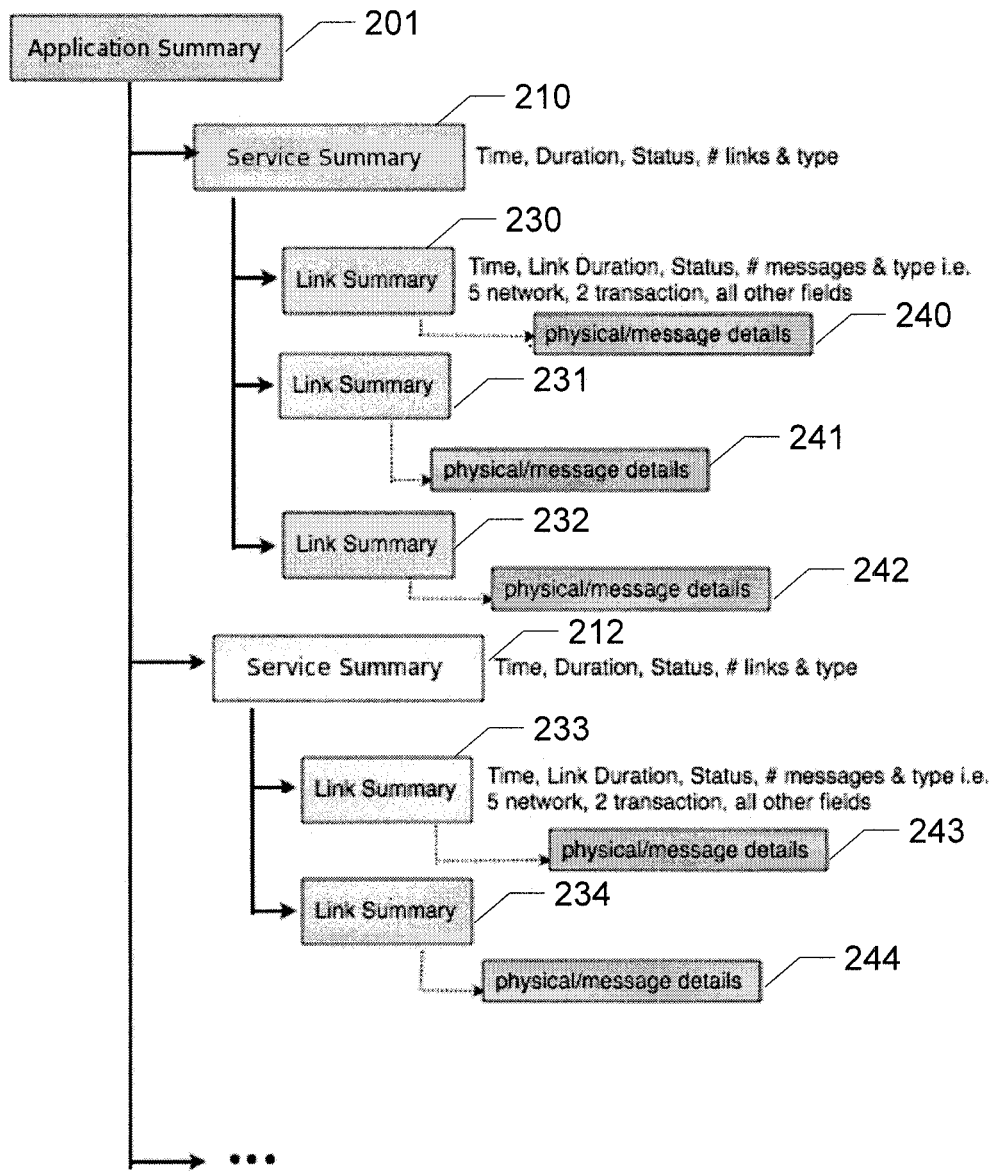
FIG. 13 is a schematic diagram illustrating a user interface representation of an application transaction in accordance with an embodiment of the invention.

FIG. 13 is a schematic diagram illustrating a user interface representation of an application transaction in accordance with an embodiment of the invention. A graphical user interface ("GUI") 380 may be used to represent the constructed hierarchy of transactions. The benefit of a GUI 380 is that it allows a user to assess the performance of a transaction-based IT system 800, or to troubleshoot performance problems within the complex system 800. A schematic representation of the hierarchy for a sample set of transactions is shown in FIG. 13. A summary of the attributes and behaviour of a given application transaction 201 may be shown, with similar summaries for each of the member service transactions 210, 212 available for selection. Further, the summaries of the link transactions 230-234 are similarly available to select from the view of the service transactions 210, 212. Finally, the details relating to the individual messages 240-244, and other details regarding the PDUs from protocols below the messages (e.g., TCP and IP), are also available.

Figure 14:
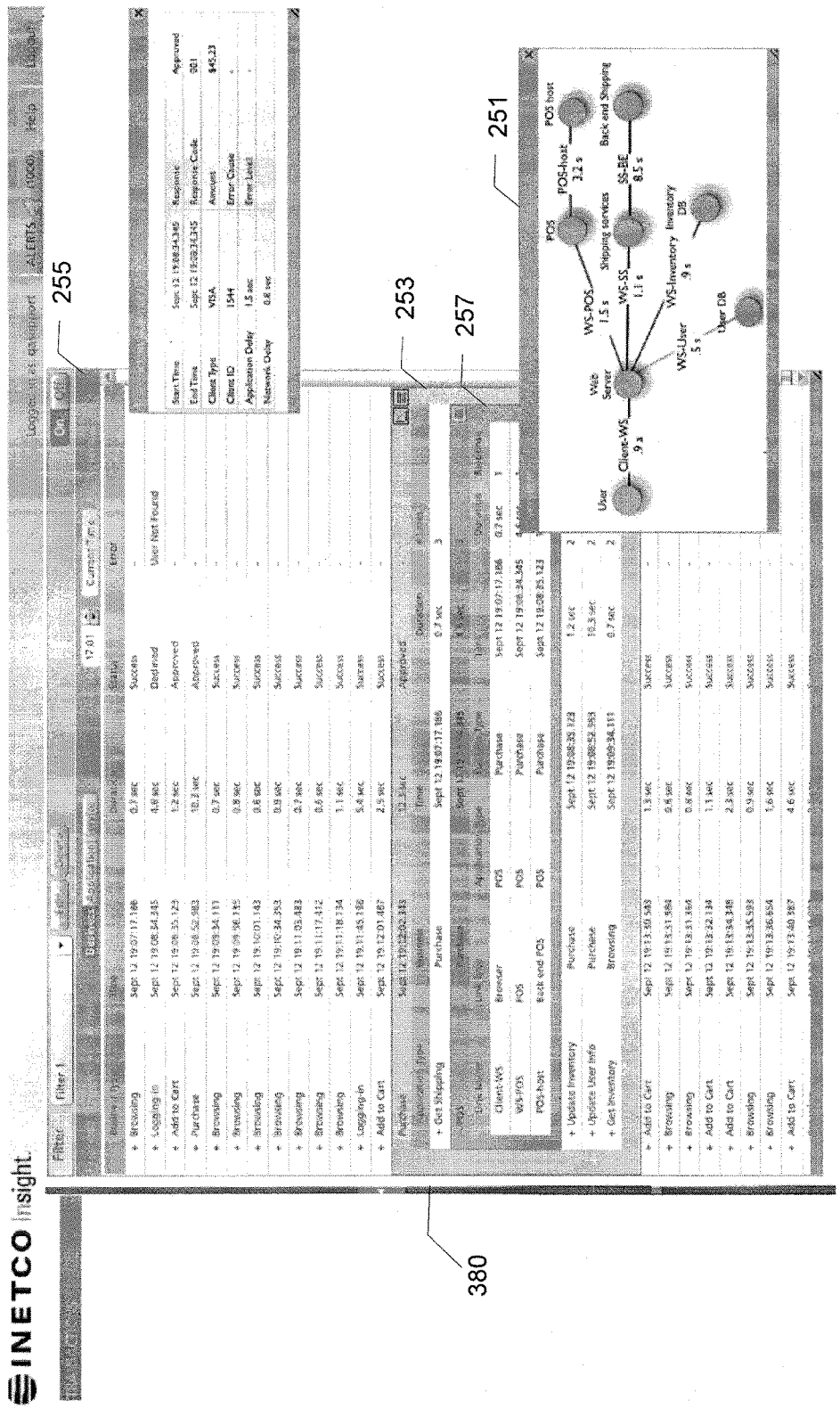
FIG. 14 is a screen capture illustrating a graphical user interface for presenting the hierarchy of transaction and related topology in accordance with an embodiment of the invention.

FIG. 14 is a screen capture illustrating a graphical user interface 380 for presenting the hierarchy of transaction and related topology in accordance with an embodiment of the invention. An example of a GUI 380 demonstrating this capability is shown in FIG. 14. FIG. 14 shows the network topology 251 and the hierarchy of related transactions 253 which appear nested. The log of transactions 255 shows a large number of top-level business transactions from which a single business transaction 253 has been selected and from which one of its constituent application transactions 257 has been further selected. The GUI 380 may be presented on the display 340 of a data processing system 300 used for monitoring transactions.

With respect to causal relationships, an analysis of two or more potentially correlated link transactions may rely on one or more different relationships and types of data. The following are some examples: (1) Sequence analysis—based on exact or probabilistic definitions of order and type of transactions at one level, as defined by topological or application implementation models, such that they may be associated to constitute a transaction at a next higher level (e.g., the implementation of a particular application may require that for each request search request originating with an HTTP/HTML-based browser client that arrives at a Web server there must be a corresponding HTTP/SOAP-based request sent from the Web server to a business logic server); (2) Timing models—based on exact or probabilistic definitions of the timings of transactions with regard to each other such that they are considered associated (e.g., it is assumed from knowledge of the application implementation that all forwarded requests caused by an inbound request are transmitted within 100 ms of the original request); (3) Header analysis—based on exact or probabilistic associations between the headers of the application protocols employed within transactions on each link (e.g., in the case of HTTP/HTML-based requests sent to a Web server resulting in HTTP/SOAP-based requests being generated on a subsequent network link, cookies within each HTTP header may contain unique ids that are explicitly, or implicitly, associated); and, (4) Payload analysis—based on exact or probabilistic associations between the contents of the payloads of the set of request/response message of given transactions (e.g., in the case of HTTP/HTML-based requests sent to a Web server resulting in HTML/SOAP-based requests being generated on a subsequent network link, a GET-initiated transaction on the Web side may have included an HTML document as a response which contains data which corresponds to data within the response message within the SOAP-based transaction on the business side.

A complete correlation method that effectively associates all possible lower level transactions into higher level transactions may rely on multiple correlation techniques that employ one or more of the possible analyses described above, either separately or in combination. As suggested, the techniques may be exact, probabilistic or approximate: Exact—causal relationships are either entirely satisfied or not; Probabilistic—causal relationships interpreted in terms of likelihoods resulting in estimates of likelihood of given associations; and, Approximate—incomplete analysis due to real-time processing constraints may generate results that are necessarily estimates of a complete analysis.

With respect to optimization for real-time correlation, correlation of messages into transactions on a single link may be performed either in real-time as messages are detected, or in batch analysis of a set of previously collected data. Real-time correlation of high transaction volumes is highly demanding and requires an optimized message decode and correlation system. Even in the case of a single network connection, it is not effective to inspect and compare all messages with all other messages. To optimize the correlation process, an effective strategy for filtering, segregating, and comparing messages is needed. The more efficient the process becomes, the more messages can be processed. In a multi-tier, multi-link systems, transactions may span many different network links and involve many different application protocols and encodings. As a consequence, there are typically many more messages of many different types collected than for transactions across systems with only a single link. Collection of the messages is typically performed at a plurality of points within the multi-link system. As the message encodings may be different at each point, the means of comparing messages must become more complex, further decreasing computational efficiency. Segregating and filtering these many messages requires a more effective strategy than currently exists to ensure that correlation is both accurate and scalable. Existing correlation solutions are typically limited to gathering and correlating messages on a single link, thus providing an incomplete view of each system-wide transaction. Correlation solutions extending to adjacent links do not scale effectively to more complex topologies. Further, they do not provide the characterization of sub-sets of the system as coherent services or account for $3^{rd}$ party services.

However, the UTM of the present invention provides a basis for effectively gathering, filtering, and correlating large numbers of messages into a hierarchy of transaction types.

Information regarding the network topology 810, organization of resources, application implementations, protocol rules, and other aspects of a given system 800 are flexibly codified into a framework or model 400. The framework separates the information into a series of levels and supports rules and means for comparison to be applied selectively. The hierarchical model 400 optimally segregates individual messages into a first level of groups such that only messages within a given first-level group are compared and constructed into first-level transactions belonging to that group. Each group may have a different basis for correlation of messages, depending on the protocols employed and how they were implemented. Subsequently, transactions within one group are selectively compared to transactions in selected other groups according to means specific to that level. The correlated first-level transactions generate composite transactions of a second-level which are segregated within a second-level group with its own attributes and properties. This process of segregating events at a plurality of levels optimizes and enables the construction of transactions across multiple links. It provides for a flexible configuration framework that can be mapped into a variety of different systems, both single link and multiple links.

With respect to transaction assessment, within an operating instance (e.g., modules 331) of the present invention that has been properly configured, transactions will be generated at each selected level of the model 400. According to one embodiment, there are at least three levels of transaction generated, namely link transactions, service transactions, and application transactions. Each level of transaction comprises one or more lower level transactions, where the lowest level (link) transaction comprises one or more network messages. According to another embodiment, a fourth level of transaction may be added, corresponding to the highest level of the model, that represents business transactions. Business transactions are at least composed of application transactions and may also include related events or objects defined outside the hierarchy.

Over a period of monitoring, the operating instance 331 will generate a plurality of each level of transaction. Some transactions may be incomplete according to the model or represent specific known states (e.g., succeeded, failed, declined). As part of its operation, the operating instance 331 may present the transactions to an end-user for inspection (e.g., via GUI 380). To aid in assessment of the observed populations, the operating instance 331 may further analyze the populations of transactions according to specific metrics of performance.

For example, the set of link transactions on a specific link for a defined period of time may be analyzed to determine the distribution of times for completion for those transactions considered "declined". The analysis may produce typical statistical measures such as minimum, maximum, mean, standard deviation, and the like. Alternatively, the analysis may select for and operate on only those link transactions that are "incomplete" and estimate the message loss associated with this population, and subsequently estimate the network packet loss. These metrics are typical for measuring the performance of networks and may be most familiar to those who operate them.

Alternatively, the population of application transactions across a specific application may be analyzed to determine the distribution of times for all transaction over a defined period of time. This distribution may then be used as input to a standard end-user experience model such as Apdex. The Apdex factor produced may then represent the overall performance of the application level of the business system 800.

With respect to metrics, in this view, transactions associated with each level of the implementation may be analyzed by one or more metrics specific to that level. Each metric may then produce a measure of performance that is responsive to factors specific to that level. These factors may include the following: (1) The individuals, groups, or roles who are involved in testing, managing, or troubleshooting related aspects of the business system. For example: network operators may be most interested in the performance of link transactions; application developers, systems integrators, and service operators, including those responsible for relationships with third parties, may be most interested in the performance of service transactions; and, business managers, customer relations agents, and end-users may be most interested in the performance of application transactions; (2) Typical or standardized metrics used within an existing and related sphere of IT management. For example: networks are often assessed in terms of packet loss, latency, jitter, and network capacity; services are often assessed in terms of dependencies between services such as availability, time-to-respond, and thresholds of behavior; in the case of the 3rd party services, the terms are often specific to Service Level Agreements ("SLAs") defined within services contracts; and, applications are often assessed in terms of end-user experience including page-load times, task completion times, and statistical aggregates based on subject preference such as Apdex; (3) Existing or constructive relationships between levels that are reflected in their respective metrics. For example: latency variation (jitter) in a specific population of link transactions may be well correlated with low Apdex scores of a related population of application transactions; and, periods of no availability in a third party service as reflected by its service transactions may be responsible for high failure rates in end-user application transactions; (4) Data available at a given level limits or enhances the scope of metrics that may be applied. For example: TCP sequence information at the network level and the presence of TCP retransmits provides the basis for packet loss estimates on an IP link; designation of a third party service qualifies it as a dependency that may require a specific set of measured thresholds particular to an existing SLA; and, identification of particular user functionalities at the access service of an application provides the basis for segmenting application transactions into relevant sub-populations—each sub-population of application transactions may represent a state in a Markov chain analysis that subsequently characterizes a typical end-user experience. The result may be a hierarchy of metrics that follow the UTM and, at least in part, are defined by the details of the topological model for a given implementation.

FIG. 15 is a table illustrating an example of metrics (e.g., 1510, 1520, 1530, 1540) specific to transaction type (e.g., 101, 90, 87, 85) in accordance with an embodiment of the invention. FIG. 15 shows a set of metrics selected for one embodiment of the invention. Based on a typical Web banking application profile in the financial industry, it identifies particular metrics of interest specific to the application and specific to the stakeholders who manage and use it.

With respect to implementation, according to one embodiment, the UTM may include the following: definition of three levels (e.g., network/link, service, application); database schema to support the delineation of link, service, and configuration, configuration of the related models, storage of related data objects, and generation of statistics based on basic performance metrics; configuration capability to accommodate definition of correlation for link, service, and application transactions; correlation capability to generate successively levels of transactions (e.g., from protocol messages into link transactions; from link transactions into service transactions, and, from service transactions into application transactions); basic metrics for performance at each level of transactions; and, presentation of the transactions at each level, including their relationship to each other within the hierarchy. Provision may also be made to accommodate the definition of business processes. This would effectively add business as a fourth level and support the correlation of application transactions into business transactions.

According to one embodiment, there is provided a method for monitoring performance of an application system 800 which is distributed across a plurality of network connected nodes 110, comprising: using a processor 320, monitoring network traffic between the plurality of network connected nodes 110 of the application system 800 to gather network traffic data; assembling the network traffic data into application messages 171; correlating (e.g., real-time correlation) the application messages 171 into sets of one or more application messages that constitute transactions 190 corresponding to a lowest level 410 of a plurality of levels 410, 420, 430, 440, 450, 460 of a hierarchical model 400 of the application system 800, each level including components 34 having a span of network connected nodes 110 specific to that level, and each level and the span of each level being defined by function; and, generating records for one or more of the transactions 190.

According to another embodiment, there is provided a method for monitoring performance of an application system 800 which is distributed across a plurality of network connected nodes 110, comprising: using a processor 320, monitoring network traffic between the plurality of network connected nodes 110 of the application system 800 to gather network traffic data; assembling the network traffic data into application messages 171; correlating (e.g., real-time correlation) the application messages 171 into sets of one or more application messages that constitute transactions 190 corresponding to a lowest level 410 of a plurality of levels 410, 420, 430, 440, 450, 460 of a hierarchical model 400 of the application system 800, each level including components having a span of network connected nodes 110 specific to that level, and each level and the span of each level being defined by function; identifying attributes of one or more of the transactions 190; and, applying one or more metrics 1510, 1520, 1530, 1540 to the attributes to measure performance of the application system 800.

With respect to each level including components having a span of network connected nodes 110 specific to that level, and each level and the span of each level being defined by function, as described above, according to one embodiment, the method of the present invention may decompose the IT system 800 into a nested set of regions or "spans" according to the network topology 810 and functional implementation of its components. The hierarchical model 400 governs the interpretation of function that determines membership in each of the levels described. Span derives from the extent of network nodes and links that are involved in completing function at a given level.

According to one embodiment, the levels of functionality may be reflected by the protocol in use and the associated API presented by entities within that level. This framework is laid out above in the illustration of the "service" level in particular. Examples of different functional services are provided there. Reference is made to the APIs being implemented by developers to instantiate those services. The span of the service is defined to be the extent of network connected nodes that is invoked to resolve a functional operation at the service level. An example of such a service might be a data storage, processing, and query service that performs its operations on multiple network nodes and that represents a set of data query functionalities as an API. Examples are provided of types of functional requests at the service level (e.g., "resolve complex data query") that might involve multiple networked nodes. The network level transactions occurring between each of those nodes compose the higher level service transactions. The extent or network span of the service level then is the aggregate of all network level spans that those network transactions comprising the service transactions might occur across.

According to one embodiment, first, the present invention provides an ontological model 700 of isomorphic levels comprising entities, events, functions, properties, and generative operators specific to each level (the "UTM") in which levels of model define spans of a network topology 810 such that transactions across each span specific to that level include one or more network links. Second, the model 400 is implemented on a network topology 810 and performs the following: segments the system 800 into spans for links, services, and applications, and businesses; accounts for 3rd party services; and, defines functionality and audience at each level. The span of each level is equal to or greater than the span of the preceding level that it is composed from. Thus, in its simplest form, an application system may be composed of one network link with a span of 1, one service with a span of 1 comprising that one network link, and one application with a span of 1 comprising that one service.

According to one embodiment, while there may be a span difference between levels it is also possible that the span may be the same from one level to the next (i.e., equal to or greater than). A specific span of one or more network links may comprise each service, and a specific set of one or more services may constitute an application such that span of the application is the cumulative spans of the services that compose it. Referring to FIG. 3, note that some services have a larger and smaller span (e.g., 2, 3 and 4 nodes in the illustrated example). In effect, each member of a given level (e.g., the service level) has a span equal to or larger than the components that make up that member.

The above embodiments may contribute to an improved method and system for monitoring performance of an application system 800 which is distributed across network connected nodes and may provide one or more advantages. First, the invention provides an ontological model 700 of isomorphic levels comprising entities, events, functions, properties, and generative operators (the "UTM") in which levels of model define "spans" of a network topology 810 such that transactions across each span include one or more network links. Second, the model 400 is implemented on a network topology 810 and performs the following: segments the system 800 into spans for links, services, and applications, and businesses; accounts for 3rd party services; and, defines functionality and audience at each level. Third, transactions are constructed for each level of hierarchy where: link transactions span a network link; service transactions span one or more links; application transactions span one or more services; and, business transactions span one or more applications. Fourth, the model 400 provides the optimization necessary for efficient real-time scalability of correlation of messages across complex topologies 810 at high message volumes. And, fifth, the invention provides for performance metrics 1510, 1520, 1530, 1540 applied to constructed transactions at each level of hierarchy 400 in accordance with standards, actors, and conventions relating to that level.

Aspects of the above described method may be illustrated with the aid of a flowchart.

Figure 17:
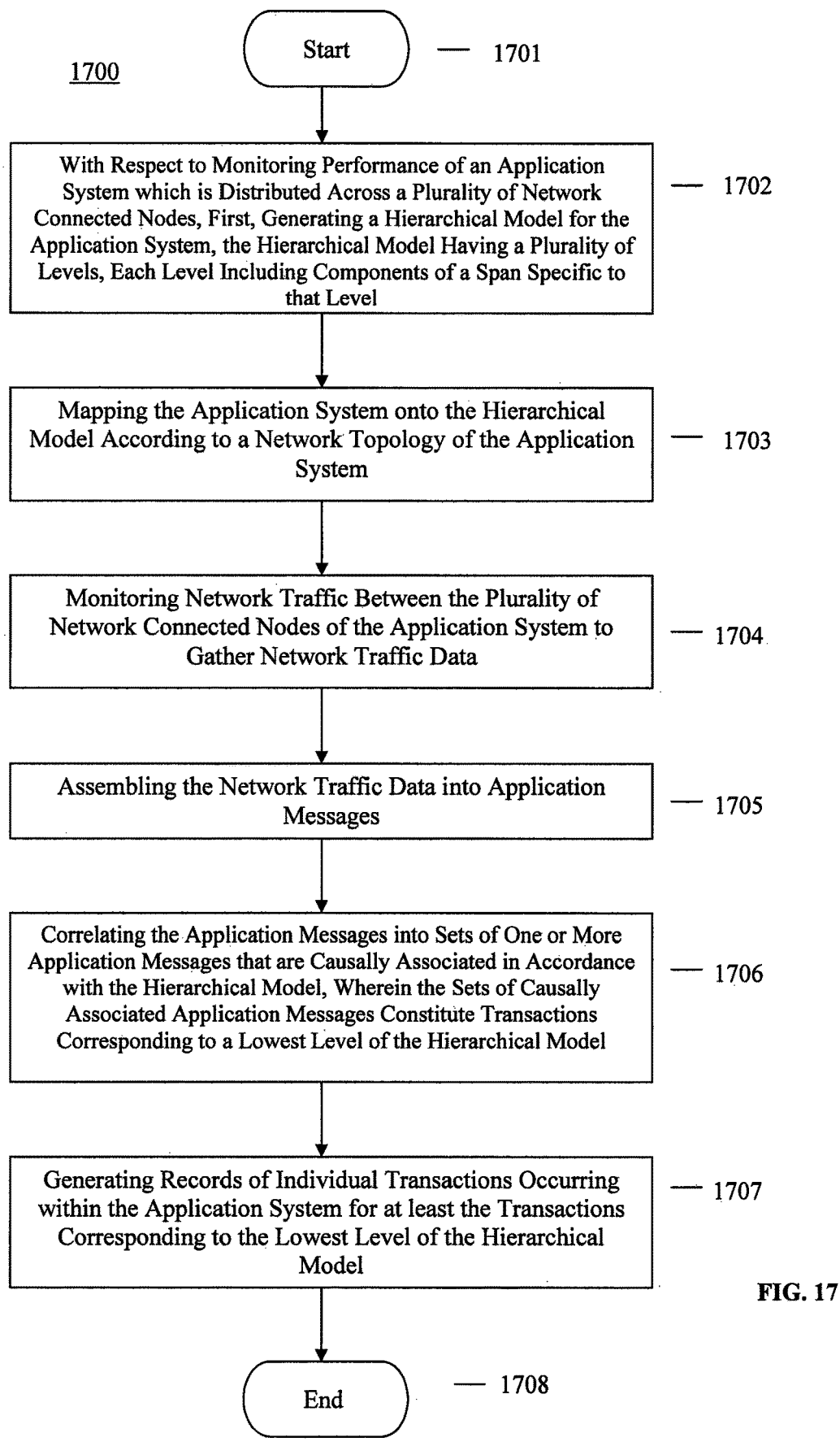
FIG. 17 is a flow chart illustrating operations of modules within a data processing system for monitoring performance of an application system which is distributed across a plurality of network connected nodes, in accordance with an embodiment of the invention; and, FIG. 18 is a block diagram illustrating a Unified Transaction Model ("UTM") in accordance with an embodiment of the invention.

FIG. 17 is a flow chart illustrating operations 1700 of modules 321, 331 within a data processing system (e.g., 300) for monitoring performance of an application system (e.g., 800) which is distributed across a plurality of network connected nodes (e.g., 110, 113), in accordance with an embodiment of the invention.

At step 1701, the operations 1700 start.

At step 1702, a hierarchical model 400 for the application system 800 is generated, the hierarchical model 400 having a plurality of levels (e.g., 420, 430, 460, 470), each level (e.g., 420) including components (e.g., 34) of a span specific to that level.

At step 1703, the application system 800 is mapped onto the hierarchical model 400 according to a network topology 810 of the application system 800.

At step 1704, network traffic is monitored between the plurality of network connected nodes (e.g., 110, 113) of the application system 800 to gather network traffic data.

At step 1705, the network traffic data is assembled into application messages (e.g., 171, 172, 173, 174 in FIG. 12).

At step 1706, the application messages 171, 172, 173, 174 are correlated into sets of application messages that are causally associated in accordance with the hierarchical model 400, wherein the sets of causally associated application messages constitute transactions (e.g., 190, 192 in FIG. 12 or 720 in FIG. 7) corresponding to a lowest level (e.g., 420) of the hierarchical model 400.

At step 1707, records of individual transactions (e.g., 190) occurring within the application system 800 are generated for at least the transactions 190, 192, 720 corresponding to the lowest level 420 of the hierarchical model 400.

At step 1708, the operations 1700 end.

The method may further include correlating transactions 190, 192, 194, 195, 198, 199 corresponding to the lowest level 420 of the hierarchical model 400 into sets of transactions that are causally associated in accordance with the hierarchical model 400, wherein the sets of causally associated transactions constitute transactions (e.g., 12151, 12153, 12155, 12157 in FIG. 12 or 730 in FIG. 7) corresponding to a higher level (e.g., 430) of the hierarchical model 400. The method may further include correlating transactions 12151, 12153, 12155, 12157 corresponding to the higher level 430 of the hierarchical model 400 into sets of transactions that are causally associated in accordance with the hierarchical model 400, wherein the sets of causally associated transactions constitute transactions (e.g., 12160 in FIG. 12 or 750 in FIG. 7) corresponding to a next higher level (e.g., 450) of the hierarchical model 400. The method may further include correlating transactions 12160 corresponding to the next higher level 450 of the hierarchical model 400 into sets of transactions that are causally associated in accordance with the hierarchical model 400, wherein the sets of causally associated transactions constitute transactions (e.g., 85 in FIGS. 12 and 7) corresponding to a highest level (e.g., 460) of the hierarchical model 400. The transactions 720 corresponding to the lowest level 420 of the hierarchical model 400, the transactions 730 corresponding in the higher level 430 of the hierarchical model 400, the transactions 750 corresponding to the next higher level 450 of the hierarchical model 400, and the transactions 760 corresponding to the highest level 460 of the hierarchical model 400 may be link transactions, service transactions, application transactions, and business transactions, respectively. The correlating 1706 of the application messages (e.g., 171, 172 across link 140) may include a rule-based comparison of attributes between application messages (e.g., 171, 172) that yields an exact match. The correlating 1706 of the application messages (e.g., 171, 172 across link 140) may include a probabilistic association between the application messages (e.g., 171, 172) based on one or more of contents of the application message payloads, contents of the application message headers, timing of the application messages, and sequence of the application messages (e.g., 171, 172). The probabilistic association may be one of a hidden Markov model, a real-time Bayesian network analysis, and a Kalman filter. The correlating of the transactions (e.g., 190, 192) corresponding to the lowest level 420 of hierarchical model 400 into the transactions (e.g., 12151) corresponding to the higher level 430 of the hierarchical model 400 may include determining potential causal relationships through analysis of the network topology 810. The correlating of the transactions (e.g., 190, 192) corresponding to the lowest level 420 of the hierarchical model 400 into the transactions (e.g., 12151) corresponding to the higher level 430 of the hierarchical model 400 may include a probabilistic association between the transactions 190, 192 corresponding to the lowest level 420 of the hierarchical model 400 based on one or more of contents of multiple application message payloads of related transactions corresponding to the lowest level 420 of the hierarchical model 400, contents of multiple application message headers of related transactions corresponding to the lowest level 420 of the hierarchical model 400, and timing of multiple application messages of related transactions corresponding to the lowest level 420 of the hierarchical model 400. The probabilistic method may be one of a hidden Markov model, a real-time Bayesian network analysis, and a Kalman filter. The method may further include, for transactions 720, 730, 750, 760 corresponding to each of the plurality of levels 420, 430, 450, 460 of the hierarchical model 400, identifying attributes of behavior relating to performance and applying one or more metrics 1510, 1520, 1530, 1540 to the attributes. The metrics 1510, 1520, 1530, 1540 applied may be specific to each of the plurality of levels 420, 430, 450, 460 of the hierarchical model 400 and may be related to conventions, standards, perspectives, or role-based objectives associated with each of the plurality of levels 420, 430, 450, 460 of the hierarchical model 400. The metrics 1510, 1520, 1530, 1540 for the link, service, application, and business transactions 720, 730, 750, 760 may include performance of networks, measures specific to a service level agreement or other third party agreement, end-user experience, and business performance, respectively. The metrics 1510 relating to performance of networks may include at least one of estimated network packet loss, delay variation, minimum delay, and maximum throughput. The metrics 1520 relating to service level agreement or other third party agreement may include at least one of average transaction rate, number of transactions per unit time, rate of failed transactions, peak transaction rate, and availability. The metrics 1530 relating to end-user experience may include at least one of Apdex value, average response time, minimum response time, maximum response time, percentage of incomplete transactions, and rate of failed transactions caused by application system problems. The metrics 1540 relating to business performance may include at least one of customer satisfaction, employee productivity, and cost savings. And, the monitoring 1740 of network traffic may be performed simultaneously at one or more nodes 110, 113 within the application system 800.

According to one embodiment, each of the above steps 1701-1708 may be implemented by a respective software module 331. According to another embodiment, each of the above steps 1701-1708 may be implemented by a respective hardware module 321 (e.g., application-specific hardware 321). According to another embodiment, each of the above steps 1701-1708 may be implemented by a combination of software 331 and hardware modules 321. For example, FIG. 17 may represent a block diagram illustrating the interconnection of specific hardware modules 1701-1708 (collectively 1700) within the data processing system 300, each hardware module 1701-1708 adapted or configured to implement a respective step of the method of the invention.

According to one embodiment, one or more of the software 331 and hardware modules 321 (or to components referred to as a "module" herein) may be implemented by one or more data processing systems 300 or components thereof.

According to one embodiment, certain implementations of the functionality of the present invention are sufficiently mathematically, computationally, or technically complex that application-specific hardware (e.g., 321) or one or more physical computing devices (e.g., 300) (using appropriate executable instructions (e.g., 331)) may be necessary or essential to perform that functionality, for example, due to the volume or complexity of the calculations involved and/or to provide results substantially in real-time.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or computer program product including program instructions recorded thereon, may direct the data processing system 300 to facilitate the practice of the method of the invention. It is understood that such apparatus, products, and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product or computer program product according to one embodiment of the invention. This computer software product or computer program product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method for monitoring performance of an application system which is distributed across a plurality of network connected nodes by a data processing system used for monitoring transactions to improve operation thereof, comprising:

using a processor of the data processing system, monitoring network traffic between the plurality of network connected nodes of the application system to gather network traffic data;

assembling the network traffic data into application messages;

in real-time, correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; wherein the span of each level is greater than or equal to the span of a next lower level, if any, that it is composed from; wherein the span is an extent of network connected nodes that are involved in completing the function at each level; wherein the function at each level is a composite of functions at the next lower level, if any; and, wherein each transaction represents an instance of the function when executed; and, generating records for one or more of the transactions, the records for use by the data processing system for improving the real-time operation thereof at high application message volumes.

2. The method of claim 1, further comprising correlating transactions corresponding to the lowest level into sets of transactions that constitute transactions corresponding to a higher level of the plurality of levels.

3. The method of claim 2, further comprising correlating transactions corresponding to the higher level into sets of transactions that constitute transactions corresponding to a next higher level of the plurality of levels.

4. The method of claim 3, further comprising correlating transactions corresponding to the next higher level into sets of transactions that constitute transactions corresponding to a highest level of the plurality of levels.

5. The method of claim 4, wherein the transactions corresponding to the lowest level, the transactions corresponding to the higher level, the transactions corresponding to the next higher level, and the transactions corresponding to the highest level are link transactions, service transactions, application transactions, and business transactions, respectively.

6. The method of claim 1, wherein the correlating of the application messages includes a rule-based comparison of attributes between application messages that yields an exact match.

7. The method of claim 1, wherein the correlating of the application messages includes a probabilistic association between the application messages based on one or more of contents of the application message payloads, contents of the application message headers, timing of the application messages, and sequence of the application messages.

8. The method of claim 7, wherein the probabilistic association is derived from one of a hidden Markov model, a real-time Bayesian network analysis, and a Kalman filter.

9. The method of claim 2, wherein the correlating of the transactions corresponding to the lowest level into the transactions corresponding to the higher level includes determining potential relationships through analysis of a network topology of the application system.

10. The method of claim 2, wherein the correlating of the transactions corresponding to the lowest level into the transactions corresponding to the higher level includes a probabilistic association between the transactions corresponding to the lowest level based on one or more of contents of multiple application message payloads of related transactions corresponding to the lowest level, contents of multiple application message headers of related transactions corresponding to the lowest level, and timing of multiple application messages of related transactions corresponding to the lowest level.

11. The method of claim 10, wherein the probabilistic method is one of a hidden Markov model, a real-time Bayesian network analysis, and a Kalman filter.

12. The method of claim 5, further comprising, for transactions corresponding to each of the plurality of levels, identifying attributes relating to performance and applying one or more metrics to the attributes.

13. The method of claim 12, wherein the metrics applied are specific to each of the plurality of levels and are related to conventions, standards, perspectives, or role-based objectives associated with each of the plurality of levels.

14. The method of claim 12, wherein the metrics for the link, service, application, and business transactions include performance of networks, measures specific to a service level agreement or other third party agreement, end-user experience, and business performance, respectively.

15. The method of claim 14, wherein the metrics relating to performance of networks include at least one of estimated network packet loss, delay variation, minimum delay, and maximum throughput.

16. The method of claim 14, wherein the metrics relating to service level agreement or other third party agreement include at least one of average transaction rate, number of transactions per unit time, rate of failed transactions, peak transaction rate, and availability.

17. The method of claim 14, wherein the metrics relating to end-user experience include at least one of Apdex value, average response time, minimum response time, maximum response time, percentage of incomplete transactions, and rate of failed transactions caused by application system problems.

18. The method of claim 14, wherein the metrics relating to business performance include at least one of customer satisfaction, employee productivity, and cost savings.

19. The method of claim 1, wherein the monitoring of network traffic is performed simultaneously at one or more nodes within the application system.

20. The method of claim 1, wherein the application system is mapped onto the hierarchical model according to a network topology of the application system.

21. A system for monitoring performance of an application system which is distributed across a plurality of network connected nodes, the system monitoring transactions to improve operation thereof, the system comprising:

a processor coupled to memory and an interface to the network; and, at least one of hardware and software modules within the memory and controlled or executed by the processor, the modules including:

a module for monitoring network traffic between the plurality of network connected nodes of the application system to gather network traffic data;

a module for assembling the network traffic data into application messages;

a module for, in real-time, correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; wherein the span of each level is greater than or equal to the span of a next lower level, if any, that it is composed from; wherein the span is an extent of network connected nodes that are involved in completing the function at each level; wherein the function at each level is a composite of functions at the next lower level, if any; and, wherein each transaction represents an instance of the function when executed; and, a module for generating records for one or more of the transactions, the records for use by the system for improving the real-time operation thereof at high application message volumes.

22. A method for monitoring performance of an application system which is distributed across a plurality of network connected nodes by a data processing system used for monitoring transactions to improve operation thereof, comprising:

using a processor of the data processing system, monitoring network traffic between the plurality of network connected nodes of the application system to gather network traffic data;

assembling the network traffic data into application messages;

in real-time, correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; wherein the span of each level is greater than or equal to the span of a next lower level, if any, that it is composed from; wherein the span is an extent of network connected nodes that are involved in completing the function at each level; wherein the function at each level is a composite of functions at the next lower level, if any; and, wherein each transaction represents an instance of the function when executed;

identifying attributes of one or more of the transactions; and, applying one or more metrics to the attributes to measure performance of the application system.

23. The method of claim 22, wherein the one or more metrics are specific to each level of the plurality of levels.

24. The method of claim 23, wherein the one or more metrics are related to one or more of conventions, standards, perspectives, and role-based objectives associated with each level of the plurality of levels.

25. The method of claim 23, further comprising correlating transactions corresponding to the lowest level into sets of transactions that constitute transactions corresponding to a higher level of the plurality of levels.

26. The method of claim 25, further comprising correlating transactions corresponding to the higher level into sets of transactions that constitute transactions corresponding to a next higher level of the plurality of levels.

27. The method of claim 26, further comprising correlating transactions corresponding to the next higher level into sets of transactions that constitute transactions corresponding to a highest level of the plurality of levels.

28. The method of claim 27, wherein the transactions corresponding to the lowest level, the transactions corresponding to the higher level, the transactions corresponding to the next higher level, and the transactions corresponding to the highest level are link transactions, service transactions, application transactions, and business transactions, respectively.

29. The method of claim 28, wherein the one or more metrics for the link, service, application, and business transactions include performance of networks, measures specific to a service level agreement or other third party agreement, end-user experience, and business performance, respectively.

30. The method of claim 29, wherein the one or more metrics relating to performance of networks include at least one of estimated network packet loss, delay variation, minimum delay, and maximum throughput.

31. The method of claim 29, wherein the one or more metrics relating to service level agreement or other third party agreement include at least one of average transaction rate, number of transactions per unit time, rate of failed transactions, peak transaction rate, and availability.

32. The method of claim 29, wherein the one or more metrics relating to end-user experience include at least one of Apdex value, average response time, minimum response time, maximum response time, percentage of incomplete transactions, and rate of failed transactions caused by application system problems.

33. The method of claim 29, wherein the one or more metrics relating to business performance include at least one of customer satisfaction, employee productivity, and cost savings.

34. The method of claim 22, wherein the correlating of the application messages includes a rule-based comparison of attributes between application messages that yields an exact match.

35. The method of claim 22, wherein the correlating of the application messages includes a probabilistic association between the application messages based on one or more of contents of the application message payloads, contents of the application message headers, timing of the application messages, and sequence of the application messages.

36. The method of claim 35, wherein the probabilistic association is derived from one of a hidden Markov model, a real-time Bayesian network analysis, and a Kalman filter.

37. The method of claim 25, wherein the correlating of the transactions corresponding to the lowest level into the transactions corresponding to the higher level includes determining potential relationships through analysis of a network topology of the application system.

38. The method of claim 25, wherein the correlating of the transactions corresponding to the lowest level into the transactions corresponding to the higher level includes a probabilistic association between the transactions corresponding to the lowest level based on one or more of contents of multiple application message payloads of related transactions corresponding to the lowest level, contents of multiple application message headers of related transactions corresponding to the lowest level, and timing of multiple application messages of related transactions corresponding to the lowest level.

39. The method of claim 38, wherein the probabilistic method is one of a hidden Markov model, a real-time Bayesian network analysis, and a Kalman filter.

40. The method of claim 22, wherein the monitoring of network traffic is performed simultaneously at one or more nodes within the application system.

41. The method of claim 22, wherein the application system is mapped onto the hierarchical model according to a network topology of the application system.

42. The method of claim 22, further comprising generating records for one or more of the transactions.

43. A system for monitoring performance of an application system which is distributed across a plurality of network connected nodes, the system monitoring transactions to improve operation thereof, the system comprising:

a processor coupled to memory and an interface to the network; and, at least one of hardware and software modules within the memory and controlled or executed by the processor, the modules including:

a module for monitoring network traffic between the plurality of network connected nodes of the application system to gather network traffic data;

a module for assembling the network traffic data into application messages;

a module for, in real-time, correlating the application messages into sets of one or more application messages that constitute transactions corresponding to a lowest level of a plurality of levels of a hierarchical model of the application system, each level including components having a span of network connected nodes specific to that level, and each level and the span of each level being defined by function; wherein the span of each level is greater than or equal to the span of a next lower level, if any, that it is composed from; wherein the span is an extent of network connected nodes that are involved in completing the function at each level; wherein the function at each level is a composite of functions at the next lower level, if any; and, wherein each transaction represents an instance of the function when executed;

a module for identifying attributes of one or more of the transactions; and, a module for applying one or more metrics to the attributes to measure performance of the application system.

* * * * *